United States Patent
Aoyama

(10) Patent No.: US 7,199,815 B2
(45) Date of Patent: Apr. 3, 2007

(54) METHOD AND APPARATUS FOR PROCESSING IMAGE, METHOD AND APPARATUS FOR TRANSMITTING DATA AND PROGRAM THEREFOR

(75) Inventor: Tatsuya Aoyama, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 161 days.

(21) Appl. No.: 10/390,608

(22) Filed: Mar. 19, 2003

(65) Prior Publication Data
US 2003/0179284 A1     Sep. 25, 2003

(30) Foreign Application Priority Data
Mar. 20, 2002  (JP)  ............................. 2002/079341
Mar. 20, 2002  (JP)  ............................. 2002/079344

(51) Int. Cl.
*H04N 7/14* (2006.01)
(52) U.S. Cl. .............................. 348/14.01; 348/14.02; 455/556.1
(58) Field of Classification Search .. 348/14.01–14.09, 348/207.1, 207.11, 207.2, 211.1, 211.2, 211.3; 709/217, 206; 455/556.1, 556.2
See application file for complete search history.

(56) References Cited

U.S. PATENT DOCUMENTS

| | | |
|---|---|---|
| 5,835,789 A | 11/1998 | Ueda et al. |
| 6,011,547 A | 1/2000 | Shiota et al. |

FOREIGN PATENT DOCUMENTS

| | | | |
|---|---|---|---|
| JP | 6-233020 | | 8/1994 |
| JP | 08-204703 | | 8/1996 |
| JP | 9-322114 | | 12/1997 |
| JP | 11-015753 | | 1/1999 |
| JP | 11-122396 | * | 4/1999 |
| JP | 2000-115688 | * | 4/2000 |
| JP | 02000115688 A | * | 4/2000 |
| JP | 2000-207216 | | 7/2000 |
| JP | 2000-244940 | * | 9/2000 |
| JP | 2000-253290 | | 9/2000 |
| JP | 2000-276335 | | 10/2000 |
| JP | 2000-287072 | * | 10/2000 |
| JP | 2002-033994 | * | 1/2002 |

* cited by examiner

*Primary Examiner*—Melur Ramakrishnaiah
(74) *Attorney, Agent, or Firm*—Sughrue Mion, PLLC

(57) ABSTRACT

Photographic information J0 is read by photographic information acquiring means 12 from image data S10 to which the photographic information J0 containing a photographing location and photographing time has been added to and, based on the photographic information J0, a first image processing condition G1 is set by first image processing condition setting means 13. On the other hand, based on the image data S10, a second image processing condition G2 is set by second image processing condition setting means 14. A final image processing condition GF0 is set by a final image processing condition setting means 15, based on the image processing conditions G1, G2. Then, image processing is carried out for the image data S10 based on the final image processing condition GF0 to obtain processed image data S11.

39 Claims, 10 Drawing Sheets

METHOD AND APPARATUS FOR PROCESSING IMAGE, METHOD AND APPARATUS FOR TRANSMITTING DATA AND PROGRAM THEREFOR

BACKGROUND OF THE INVENTION

1. Field of the Invention

The present invention relates to an image processing method and an image processing apparatus for carrying out image processing for image data to obtain processed image data, and a program for making a computer execute the image processing method.

The present invention also relates to a data transmitting method and a data transmitting apparatus for transmitting data necessary for a terminal in response to a request from the terminal, and a program for making a computer execute the data transmitting method.

2. Description of the Related Art

There has been known a system for reproducing by use of an output device such as a printer or a monitor image data acquired by an image pickup device such as a digital camera, or image data acquired by using a scanner to read an image recorded on a photographic film. In reproduction of the image data, quality of the reproduced image can be improved by carrying out various image processes such as density conversion, white balance adjustment, tone conversion, saturation emphasis, sharpness processing etc. In this case, conditions for image processing can be acquired by analyzing the image data.

In order to obtain a higher-quality reproduced image, a method has been proposed (U.S. Pat. No. 6,011,547) for carrying out more appropriate image processing by referring to the photographic information added to the image data in image processing, the photo graphic information being added as head information or tag information of the image data. This head information or tag information includes image pickup information indicating photographing conditions such as whether flash is turned ON/OFF, a lighting type, gamma characteristics of a camera, a focal distance of a lens, an F value of the lens, a content of AE processing carried out within the camera and the like. A method has also been proposed that includes information indicating a time and location of photography of the image data into the photographic information by using a GPS function, and based on the photographic information a color temperature of daylight at the time of photography is estimated and in accordance with this white balance adjustment for the image data is carried out (Japanese Unexamined Patent Publication No. 2000-244940).

The popularization of portable telephones has been remarkable. Recently, camera-equipped portable terminals (hereinafter referred to as a camera-equipped portable terminal) such as camera-equipped portable telephones having photographing means for acquiring image data by photography have become popular (e.g., Japanese Unexamined Patent Publication Nos. 6 (1994)-233020, 9 (1997)-322114, and 2000-253290). Use of such a camera-equipped portable terminal enables setting of one's favorite image data acquired by photographing as a wallpaper of the portable terminal. Additionally, the image data acquired by photographing can be attached to electronic mail and transmitted to a friend's portable terminal such as a portable telephone or a PDA. Therefore when an engagement has to be cancelled or when there is a possibility of running late for a meeting time, one's own present situation can be notified to the friend, for example by photographing a sorry looking facial expression and transmitting it to the friend. Thus, the portable terminal is convenient for communication with friends.

An image server has been proposed which is equipped with an image processing apparatus for acquiring processed image data after carrying out various image processes to the image data acquired from the camera-equipped portable telephone. Such an image server receives the image data from the camera-equipped portable terminal, carries out image processing as instructed by a user to the image data at the camera-equipped portable terminal, and transmits the processed image data acquired by the image processing to a destination designated by the user at the camera-equipped portable terminal. Further, the image data is stored at the image server, and the image data can be transmitted to a camera-equipped portable terminal when requested therefrom. By carrying out image processing for the image data at such an image server, a high-quality image can be set as the wallpaper, and transmitted to the friend.

As the camera installed in the camera-equipped portable terminal is not one with very advanced functionality, an image represented by the image data acquired by the camera-equipped portable terminal has an undertone, and consequently the image quality is not so good. Hence, for these reasons the methods described in the U.S. Pat. No. 6,011,547 and Japanese Unexamined Patent Publication No.2000-244940, image processing carried out for the image data based on photographic information is conceivable for these images.

However, since the camera installed in the camera-equipped portable terminal is not one with very advanced functionality, it is impossible to obtain the photographic information indicating photographing conditions such as whether flash is turned ON/OFF, a lighting type, gamma characteristics of the camera, a focal distance of a lens, an F value of the lens, a content of AE processing carried out in the camera and the like in photographing which are necessary for the method described in the U.S. Pat. No. 6,011,547. According to the method described in the Japanese Unexamined Patent Publication No. 2000-244940, white balance adjustment is carried out for the image data based on a time and location of photography. However, since the quality of the image data acquired by the camera-equipped portable terminal is not so high as described above, it is impossible to obtain a high-quality image by just carrying out the white balance adjustment.

On the other hand, there has been a data communication method proposed (Japanese Unexamined Patent Publication No. 2000-207216) in which application programs and data files suited to a roaming destination of the portable terminal is stored at a server, and an appropriate application program or data file is transmitted to the portable terminal in accordance with its roaming destination. Additionally, there has been a method proposed (Japanese Unexamined Patent Publication No.2000-276335) for managing version information of an application program installed in the portable terminal, for constantly storing a latest version of an application program in the server, and for automatically transmitting and installing the application program from the server into the portable terminal if the version of the application program installed in the portable terminal is older than that of the application program stored in the server when the portable terminal accesses the server.

According to the aforementioned methods, since the application program or the data file (simply referred to as data, hereinafter) is transmitted from the server to effectively operate the portable terminal, the portable terminal can always function in an optimal state.

Furthermore, in the case of the camera-equipped portable terminal capable of acquiring image data, by applying the methods described in the Japanese Unexamined Patent Publication Nos. 2000-207216 and 2000-276335, the application program for image processing is transmitted from the server to the portable terminal. Accordingly, image processing can be carried out for the image data at the portable terminal.

However, because functions provided on portable terminals vary in accordance with the model thereof, in such methods as described in Japanese Unexamined Patent Publication Nos. 2000-207216 and 2000-276335, even if data is automatically transmitted, there are times that the application may not be executed or the data may not be opened at the portable terminal which receives the data. In such cases, because the pointless data uses a communication line, there is a problem of a reduction in transmission efficiency of data from the server.

On the other hand, in the above case, an instruction may be issued from the portable terminal to execute processing by an application program at the server. However, a load on the server is increased which lowers processing efficiency.

SUMMARY OF THE INVENTION

The present invention was made with the foregoing situations in mind. A first object is to obtain processed image data which enables reproduction of a high-quality image by carrying out image processing for image data acquired in a camera with not such advanced functionality similar to a camera installed in a camera-equipped portable terminal.

A second object is to reproduce an easily viewed image in accordance with a viewing environment of the image displayed on a portable terminal equipped with a camera when image data is displayed on the camera-equipped portable terminal.

A third object is to efficiently transfer data to a terminal.

A first image processing method of the present invention is for acquiring processed image data by carrying out image processing for image data to which photographic information containing a photographing location and photographing time are added under predetermined image processing conditions, and includes the steps of:

acquiring the photographic information from the image data;

setting a first image processing condition for the image processing based on the photographic information;

setting a second image processing condition for the image processing based on the image data; and setting the predetermined image processing conditions based on the first and second image processing conditions.

"Information regarding the photographing location" may even contain a latitude and a longitude by using a GPS function. However, for example in the case of image data acquired in a camera-equipped portable terminal, a location of abase station of the portable terminal nearest a photographing location may be used as information regarding the photographing location. Additionally, if the portable terminal is located indoors, the fact that a location is indoor may be used as information regarding the photographing location.

A second image processing method of the present invention is for reading image data stored in image storage means, carrying out image processing under predetermined image processing conditions for the read image data to obtain processed image data, and transmitting the processed image data to a portable terminal which requests transmission of the processed image data, and includes the steps of:

acquiring terminal information containing any of a location of the portable terminal, a time of making the transmission request and model information of the portable terminal;

setting a first image processing condition for the image) processing based on the terminal information;

setting a second image processing condition for the image processing based on the image data; and setting the predetermined image processing conditions based on the first and second image processing conditions.

A third image processing method is for acquiring processed image data by carrying out image processing under predetermined image processing conditions, for image data acquired by a camera-equipped portable terminal, to which photographic information containing a photographing location and photographing time is added, and transmitting the processed image data to the camera-equipped-portable terminal, including the steps of:

acquiring the photographic information from the image data;

setting a first image processing condition for the image processing based on the photographic information;

setting a second image processing condition for the image processing based on the image data;

acquiring terminal information containing any of a location of the camera-equipped portable terminal, a time of making a transmission request and model information of the camera-equipped portable terminal;

setting a third image processing condition for the image processing based on the terminal information; and setting the predetermined image processing conditions based on the first, second and third image processing conditions.

A first image processing apparatus of the present invention includes:

processing means for acquiring processed image data by carrying out image processing, under predetermined image processing conditions, for image data to which photographic information containing a photographing location and photographing time are added, an image processing apparatus comprising:

photographic information acquiring means for acquiring the photographic information from the image data;

first image processing condition setting means for setting a first image processing condition for the image processing based on the photographic information;

second image processing condition setting means for setting a second image processing condition for the image processing based on the image data; and final image processing condition setting means for setting the predetermined image processing conditions based on the first and second image processing conditions.

A second image processing apparatus of the present invention includes:

reading means for reading image data stored in image storage means, processing means for carrying out image processing for the read image data under predetermined image processing conditions to obtain processed image data, and communication means for transmitting the processed image data to a portable terminal which requests transmission of the processed image data, an image processing apparatus comprising: terminal information acquiring means for acquiring terminal information containing any of a location of the portable terminal, a time of making the transmission request and model information of the portable terminal;

first image processing condition setting means for setting a first image processing condition for the image processing based on the terminal information;

second image processing condition setting means for setting a second image processing condition for the image processing based on the image data; and final image processing condition setting means for setting the predetermined image processing conditions based on the first and second image processing conditions.

A third image processing apparatus of the present invention includes:

processing means for acquiring processed image data by carrying out image processing under predetermined image processing conditions, for image data acquired by a camera-equipped portable terminal, to which photographic information containing a photographing location and photographing time is added, and communication means for transmitting the processed image data to the camera-equipped portable terminal, an image processing apparatus comprising:

photographic information acquiring means for acquiring the photographic information from the image data;

first image processing setting means for setting a first image processing condition for the image processing based on the photographic information;

second image processing condition setting means for setting a second image processing condition for the image processing based on the image data;

terminal information acquiring means for acquiring terminal information containing any of the location of the portable terminal, the time of making the transmission request and the model information of the portable terminal;

third image processing condition setting means for setting a third image processing condition for the image processing based on the terminal information; and final image processing condition setting means for setting the predetermined image processing conditions based on the first, second and third image processing conditions.

Note that a program for making a computer execute each of the image processing methods of the present invention may be provided.

According to the first image processing method and the first image processing apparatus of the present invention, the photographic information added to the image data is acquired and, based on the photographic information, the first image processing condition for the image processing is set. The first image processing condition takes the photographing location and the photographing time contained in the photographic information into consideration. On the other hand, the second image processing condition for the image processing is set based on the image data. The second image processing condition is based on the information which the image data itself has. Then, the predetermined image processing conditions for carrying out the final image processing for image data are set based on the first and second image processing conditions. Based on the predetermined image processing conditions, the image processing is carried out for the image data to obtain the processed image data.

Since a camera installed in a camera-equipped portable terminal is one with not such advanced functionality, it is often the case that just photographic information regarding a photographing location and photographing time is acquired. Additionally, since an image represented by image data acquired in the camera is not so high in quality, there is a limit to image processing if only an image processing condition acquired based on the image data is used. According to the first image processing method and the first image processing apparatus of the present invention, since the image processing is carried out for the image data by setting the predetermined image processing conditions based on the first image processing condition taking the photographing location and the photographing time into consideration, and the second image processing condition acquired based on the image data, even in the case of the image data acquired in the camera with not such advanced functionality similarly to the camera installed in the camera-equipped portable terminal, it is possible to obtain processed image data for enabling reproduction of a high-quality image.

According to the second image processing method and the second image processing apparatus of the present invention, when there is a transmission request of the image data stored in the image storage means from the portable terminal, the terminal information containing the location of the portable terminal, the time of making the transmission request and/or model information of the portable terminal is acquired, and the first image processing condition is set for the image processing based on the terminal information. The first image processing condition takes the location of the portable terminal, the time of requesting the transmission and viewing the image and/or model characteristics into consideration. On the other hand, the second image processing condition for the image processing is set based on the image data. The second image processing data is based on information which the image data has itself. Then, the predetermined image processing conditions are set for carrying out the final image processing for the image data based on the first and second image processing conditions. The image processing is carried out for the image data based on the predetermined image processing conditions to obtain the processed image data, and this processed image data is transmitted to the portable terminal.

In the camera-equipped portable terminal, the image is displayed under various display environments such as various locations, time zones and the like. However, the displayed image may become difficult to see depending on an environment in which the image is viewed. Additionally, even with the same image, an appearance may vary depending on model characteristics of the camera-equipped portable terminal. According to the second image processing method and the second image processing apparatus of the present invention, the image processing is carried out by setting the predetermined image processing conditions based on both of the first image processing condition which takes the location of the camera-equipped portable terminal, the time of viewing the image and/or the model into consideration and the second image processing condition acquired based on the image data. Thus, in the camera-equipped portable terminal, a clear image suited to its viewing environment and/or model characteristics can be reproduced.

According to the third image processing method and the third image processing apparatus of the present invention, the image is acquired by photography by the camera-equipped portable terminal. The photographic information and the terminal information are added to the image data. The photographic information added to the image data is acquired and, based on the photographic information, the first image processing condition for the image processing is set. The first image processing condition takes the photographing location and the photographing time contained in the photographic information into consideration. On the other hand, the second image processing condition for the image processing is set based on the image data. The second image processing condition is based on information which the image data has itself. Further, the terminal information containing the location of the camera-equipped portable terminal, the time of making the transmission request and/or the model information of the camera-equipped portable terminal is acquired, and the third image processing condition for the image processing is set based on the terminal information. The third image processing condition takes the location of the camera-equipped portable terminal, the time of making the transmission request and viewing the image and/or the model characteristics into consideration. Then, the predetermined image processing conditions for carrying out the final image processing for the image data are set based on the first, second and third image processing conditions, and the image processing is carried out for the image data based on the predetermined image processing conditions.

Since a camera installed in a camera-equipped portable terminal is one with not such advanced functionality, it is often the case that just photographic information of a photographing location and photographing time is acquired. Additionally, since an image represented by image data acquired in the camera is not high in quality, there is a limit to image processing if only an image processing condition acquired based on the image data is used. According to the third image processing method and the third image processing apparatus of the present invention, since the image processing is carried out for the image data by setting the predetermined image processing conditions based on both of the first image processing condition which takes the photographing location and the photographing time into consideration, and the second image processing condition acquired based on the image data, even in the case of the image data acquired in the camera with not such advanced functionality similarly to the camera installed in the camera-equipped portable terminal, it is possible to obtain processed image data that enables reproduction of a high-quality image.

In the camera-equipped portable terminal, the image is displayed under various display environments such as various locations, time zones and the like. However, the displayed image may become difficult to see depending on an environment in which the image is viewed. Additionally, even with the same image, an appearance may vary depending on model characteristics of the camera-equipped portable terminal. According to the third image processing method and the third image processing apparatus of the present invention, the image processing is carried out by setting the predetermined image processing conditions based on the third image processing condition which takes the location of the camera-equipped portable terminal, the time of viewing the image and/or the model into consideration in addition to the first image processing condition which takes the location of the camera-equipped portable terminal, the time of viewing the image and/or the model into consideration and the second image processing condition acquired based on the image data. Thus, in the camera-equipped portable terminal, a clear image suited to its viewing environment and/or model characteristics can be reproduced.

A data transmission method of the present invention is for transmitting predetermined data to a terminal in response to a request from the terminal, and includes the steps of:

acquiring transmission request information transmitted from the terminal to request transmission of desired data, and terminal information indicating a model of the terminal;

deciding a type of data to be transmitted to the terminal based on the transmission request information and the terminal information; and transmitting the decided type of data to the terminal.

"Terminal" includes all types of terminals capable of transmitting/receiving data through communication lines such as a personal computer, a portable telephone, a PDA or the like.

"Data" includes all types of electronic information such as an application program, a data file or the like.

According to the data transmission method of the present invention, if the transmission request information is for requesting transmission of image data stored in image storage means, based on the transmission request information, requested image data may be read from the image storage means in accordance with the transmission request information and, based on the terminal information, a decision may be made as to whether first data constituted of processed request image data acquired by carrying out image processing for the requested image data, or second data constituted of the requested image data and an image processing application program for carrying out image processing for the request image data is transmitted to the terminal.

Thus, since the image processing application program and the requested image data are transmitted only to the terminal capable of executing the image processing application program, it is not necessary to carry out image processing in a server which is the origin of a data transmission, and a processing load on the server can be reduced compared with the case of transmitting the processed image data to all terminals.

According to the data transmission method of the present invention, if the transmission request information is for requesting transmission of image data stored in image storage means, based on the transmission request information, requested image data may be read from the image storage means in accordance with the transmission request information, determination may be made as to whether the transmission request information contains information for transmission of processed requested image data acquired by carrying out image processing for the requested image data. If the determination is positive, transmission of first data constituted of the processed requested image data acquired by carrying out the image processing for the requested image data to the terminal may be decided. If the determination is negative, based on the terminal information, transmission of either one of the first data and second data constituted of the requested image data and an image processing application program for carrying out image processing for the request image data may be decided.

Thus, even in the case of the terminal capable of executing the image processing application program, the processed requested image data desired by the terminal can be transmitted.

According to the data transmission method of the present invention, if the transmission of the second data is decided, determination is made as to whether the image processing application program has been transmitted to the terminal which transmitted the transmission request information. If the determination is positive, transmission of third data constituted of only the requested image data to the terminal is decided in place of the second data and, if the determination is negative, transmission of the second data to the terminal is decided. Thus, if the image processing program has been transmitted to the terminal, retransmission of the image application program is eliminated to prevent pointless data transmission. Accordingly, it is possible to carry out data transmission efficiently.

Further, according to the data transmission method of the present invention, in the case that the terminal is a camera-equipped terminal having a camera for acquiring image data by photographing and the transmission request information is for requesting transmission of information indicating advisability of image processing in the camera-equipped terminal for the image data acquired by the camera-equipped terminal, based on the terminal information, a decision is made as to whether either one of fourth data representing information for request of transmission of the acquired image data, and fifth data constituted of an image processing application program for carrying out image processing for the acquired image data is transmitted to the camera-equipped terminal. In this case, since only the image processing application is transmitted to the camera-equipped terminal capable of executing the image processing by the image processing application program, it is not necessary to transmit the image data to the server which is the origin of a data transmission from the camera-equipped terminal. Accordingly, it is possible to save communication expenses necessary for image data transmission from the terminal. Additionally, since it is not necessary to carry out image processing in the server which is the origin of a data transmission, a load on the server can be reduced compared with the case of transmitting the processed image data to all the terminals.

A data transmission apparatus of the present invention is for transmitting predetermined data to a terminal in response to a request from the terminal, and includes:

information acquiring means for acquiring transmission request information transmitted from the terminal to request transmission of desired data, and terminal information indicating a model of the terminal;

transmission data deciding means for deciding a type of data to be transmitted to the terminal based on the transmission request information and the terminal information; and transmission means for transmitting the decided type of data to the terminal.

The data transmission apparatus of the present invention further includes image storage means for storing the image data, and reading means for reading based on the transmission request information requested image data from the image storage means in accordance with the transmission request information if the transmission request information is for requesting transmission of the image data stored in the image storage means. The transmission data deciding means may make a decision, based on the terminal information, if the transmission request information is for requesting the transmission of the image data stored in the image storage means, as to whether either one of first data which is constituted of processed request image data acquired by carrying out image processing for the requested image data, and second data which is constituted of the requested image data and an image processing application program for carrying out image processing for the request image data is transmitted to the terminal.

The data transmission apparatus of the present invention further includes image storage means for storing the image data, and reading means for reading requested image data from the image storage means in accordance with the transmission request information if the transmission request information is for requesting transmission of the image data stored in the image storage means based on the transmission request information. The transmission data deciding means may read, based on the transmission request information, requested image data from the image storage means in accordance with the transmission request information if the transmission request information is for requesting transmission of image data stored in image storage means, may make determination as to whether the transmission request information contains information for transmission of processed requested image data acquired by carrying out image processing for the requested image data, may decide transmission of first data which is constituted of the processed requested image data acquired by carrying out the image processing for the requested image data to the terminal if the determination is positive, and may, based on the terminal information decide transmission of either one of the first data and second data which is constituted of the requested image data and an image processing application program for carrying out image processing for the request image data if the determination is negative.

According to the data transmission apparatus of the present invention, the transmission data deciding means may make a determination, if the transmission of the second data is decided, as to whether the image processing application program has been transmitted to the terminal which has transmitted the transmission request information, may decide transmission of third data constituted of the requested image data to the terminal in location of the second data if the determination is positive, and may decide transmission of the second data to the terminal if the determination is negative.

According to the data transmission apparatus of the present invention, in the case that the terminal is a camera-equipped terminal having a camera capable of acquiring image data by photographing and the transmission request information is for requesting transmission of information indicating advisability of image processing in the camera-equipped terminal for the image data acquired in the camera-equipped terminal, based on the terminal information, the transmission data deciding means may make a decision as to whether either one of fourth data representing information of transmission of the acquired image data, and fifth data constituted of an image processing application program for carrying out image processing for the acquired image data is transmitted to the camera-equipped terminal.

A program for making a computer execute the data transmission method of the present invention may be provided.

According to the data transmission method and the data transmission apparatus of the present invention, based on the transmission request information transmitted from the terminal and the terminal information indicating the model of the terminal, the data to be transmitted to the terminal is decided, and the decided data is transmitted to the terminal. Thus, since pointless data is not processed by the terminal and not transmitted to the terminal which requests transmission, it is possible to carry out data transmission efficiently. Furthermore, since it is not necessary to carry out pointless processing in the server which is the origin of a data transmission, a processing load on the server can be reduced.

DESCRIPTION OF THE PREFERRED EMBODIMENTS

Figure 1:
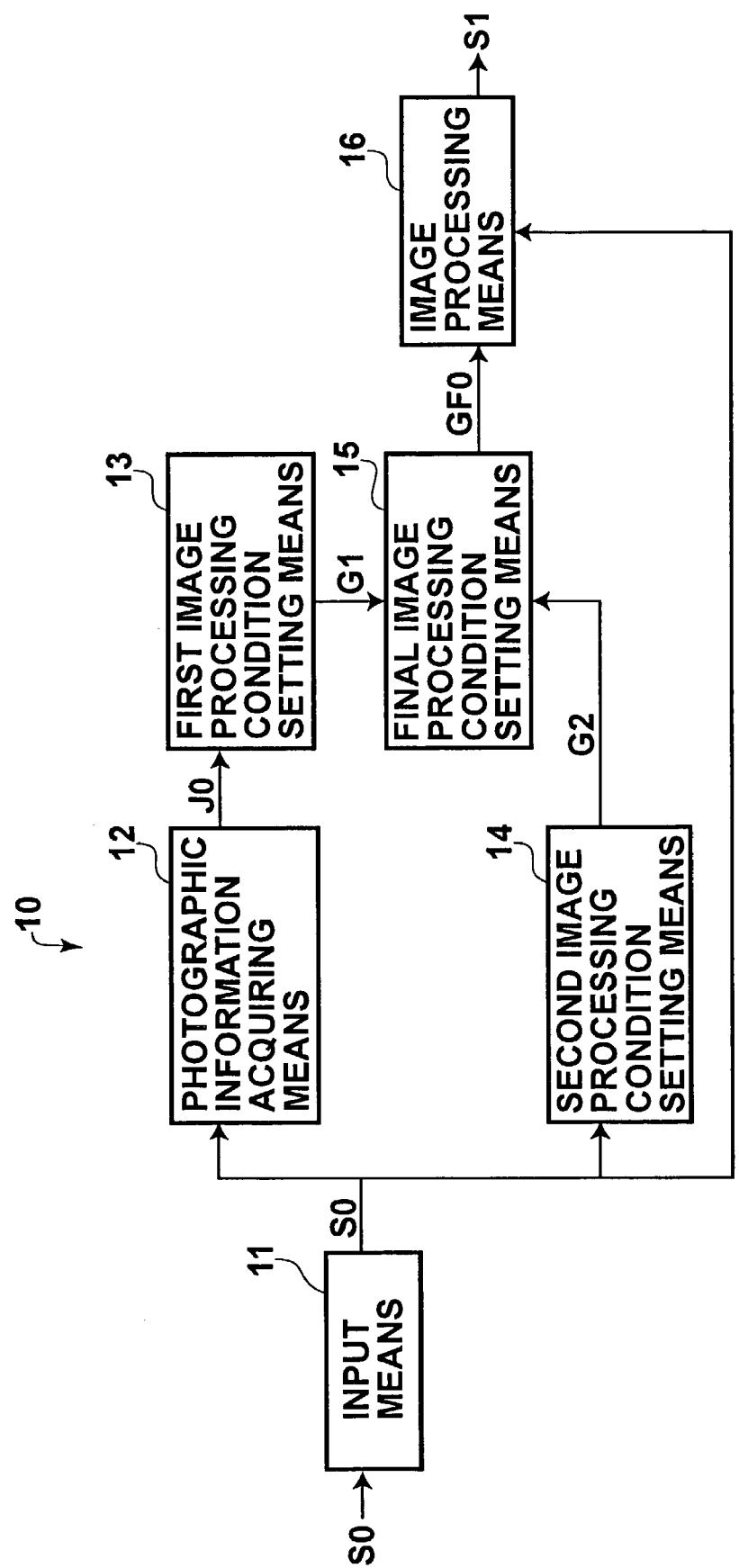
FIG. 1 is a schematic block diagram showing the constitution of an image processing apparatus according to a first embodiment of the present invention.

Next, description will be made of the preferred embodiments of the present invention with reference to the accompanying drawings. FIG. 1 is a schematic block diagram showing a constitution of an image processing apparatus according to a first embodiment of the present invention. As shown in FIG. 1, the image processing apparatus 10 of the first embodiment of the present invention is provided with: input means 11 for receiving an input of image data S0 to which photographic information J0 containing a photographing location and time is added as header information or tag information; photographic information acquiring means 12 for acquiring the photographic information J0 by reading it out of the header or tag information of image data S0; first image processing condition setting means 13 for setting a first image processing condition G1 used to carry out image processing for the image data S0 based on the photographic information J0; second image processing condition setting means 14 for setting a second image processing condition G2 used to carry out image processing for the image data S0 after analyzing the image data s0 thereof; final image processing condition setting means 15 for setting a final image processing condition GF0 which is a final image processing condition used to carry out image processing for the image data S0 based on the first and second image processing conditions G1, G2; and image processing means 16 for acquiring processing image data S1 by carrying out image processing for the image data S0 based on the final image processing condition GF0.

The image data S0 is photographed by, for example a camera-equipped portable telephone. Time of photographing is added as photographing time, and furthermore location information of the nearest base station located to the camera-equipped portable telephone at the photographing time (relatively simple information such as an address, whether it is outdoor or indoor) is added as photographic information into the header information or the tag information. Incidentally, as the camera installed in the camera-equipped portable telephone is not one with very advanced functionality, an image represented by the image data S0 is not one of such a high quality.

The input means 11 includes a communication interface for receiving the image data S0 transmitted from, for example the camera-equipped portable telephone. Depending on what form the image data S0 is provided, the input means 11 uses a medium drive such as a CD-R drive or a DVD-R drive, or a network interface or the like.

The first image processing condition setting means 13 sets the first image processing condition G1 for carrying out image processing for the image data S0 based on the photographic information J0. For example, since photographing with underexposure is generally predicted in the case when a photographing location contained in the photographic information J0 is "outdoor" and the photographing time is at night, the first image processing condition G1 is set so as to brighten an image. If a photographing location is "indoor", since illumination is by a tungsten lamp or a fluorescent lamp, the first image processing condition G is set to adjust an image white balance so that a color temperature can be set in accordance with the tungsten lamp or the fluorescent lamp.

The second image processing condition setting means 14 analyzes the image data S0 by acquiring its histogram or white point, and sets the second image processing condition G2 such as a tone processing condition, a density correction condition, a color conversion condition or the like.

The final image processing condition setting means 15 sets the final image processing condition GF0 based on the first and second image processing conditions G1, G2. In the case of the first image processing condition setting means 13, the first image processing condition G1 is set in accordance with the photographing location or the photographing time. However, for example, there are bright locations even outdoors at night, and it may not be known whether illumination is by the tungsten lamp or the fluorescent lamp even indoors. Thus, in the first embodiment, the final image processing condition GF0 is decided by using the first and second image processing conditions G1, G2.

For example, assuming that the first image processing condition G1 is for brightening the image, if the second image processing condition G2 is also for brightening the image, the image is assumed to be under exposed, and the final image processing condition GF0 is set by increasing the amount of correction to further brighten the image. Conversely, assuming that the first image processing condition is for brightening the image, if the second image processing condition G2 is not for correcting brightness of the image, the final image processing condition GF0 is set to slightly brighten the image.

If the first image processing condition G1 is for indoors and the second image processing condition G2 is for the tungsten lamp, the final image processing condition GF0 is set where the amount of white balance adjustment for the tungsten lamp is increased while taking into consideration that the location is indoors.

The image processing means 16 acquires processed image data S1 by carrying out image processing for the image data S0 based on the final image processing condition GF0.

Figure 2:
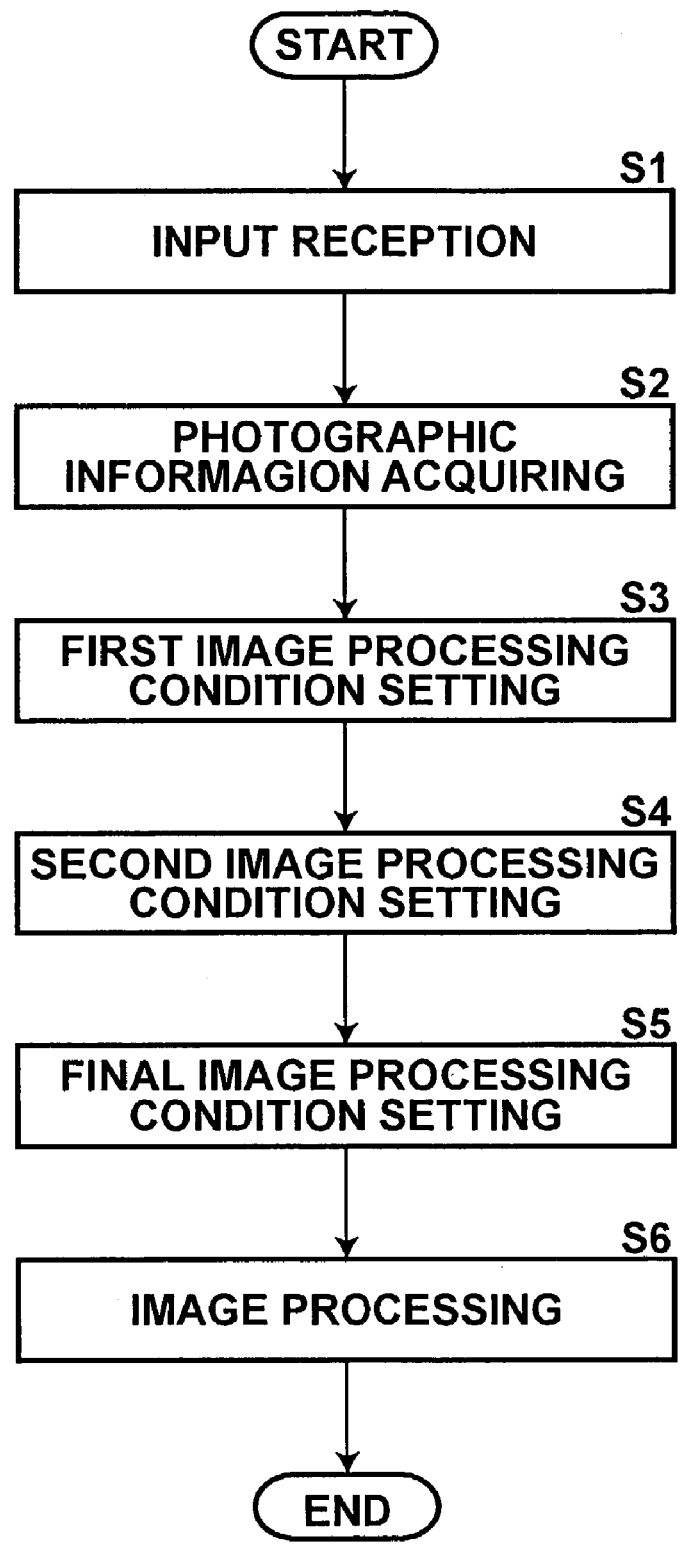
FIG. 2 is a flowchart showing a process carried out in the first embodiment.

Next, an operation of the first embodiment will be described. FIG. 2 is a flowchart showing a process carried out in the first embodiment. First, in the input means 11, an input of image data S0 (step S1) is received, and the photographic information acquiring means 12 acquires photographic information J0 added to the image data S0 (step S2). Then, the first image processing condition setting means 13 sets a first image processing condition G1 based on the photographic information J0 (step S3). Meanwhile, the second image processing condition setting means 14 sets a second image processing condition G2 based on the image data S0 (step S4). Incidentally, the processes of steps S2 and S3 and the processing of step S4 may be reversed or carried out in parallel.

Then, the final image processing condition setting means 15 sets a final image processing condition GF0 based on the first and second image processing conditions G1, G2 (step S5). Then, the image processing means 16 carries out image processing for the image data S0 based on the final image processing condition GF0 to obtain processed image data S1 (step S6), and the processing is finished. Reproduction of the processed image data S1 is provided for by a monitor or a printer.

Thus, according to the first embodiment, the final image processing condition GF0 is set based on the first image processing condition G1 which is set based on the photographic information J0 and the second image processing condition G2 which is set based on the image data S0.

In this case, since the camera installed in the portable terminal is not one with very advanced functionality as in the case of the camera-equipped portable telephone, it is often the case that photographic information J0 of just a photographing location and photographing time is acquired. Additionally, since an image shown by image data s0 acquired in the camera is not of such a high quality, there is a limit to image processing when just the second image processing condition G2 acquired based on the image data S0 is used. According to the first embodiment, since the image processing is carried out for the image data S0 by setting the final image processing condition GF0 based on the first image processing condition G1 set based on the photographic information J0, and the second image processing condition G2 set based on the image data S0, even in the case of the image data S0 acquired in the camera with not such advanced functionality similarly to the camera installed in the portable terminal, it is possible to obtain processed image data S1 which enables reproduction of a high-quality image.

Figure 3:
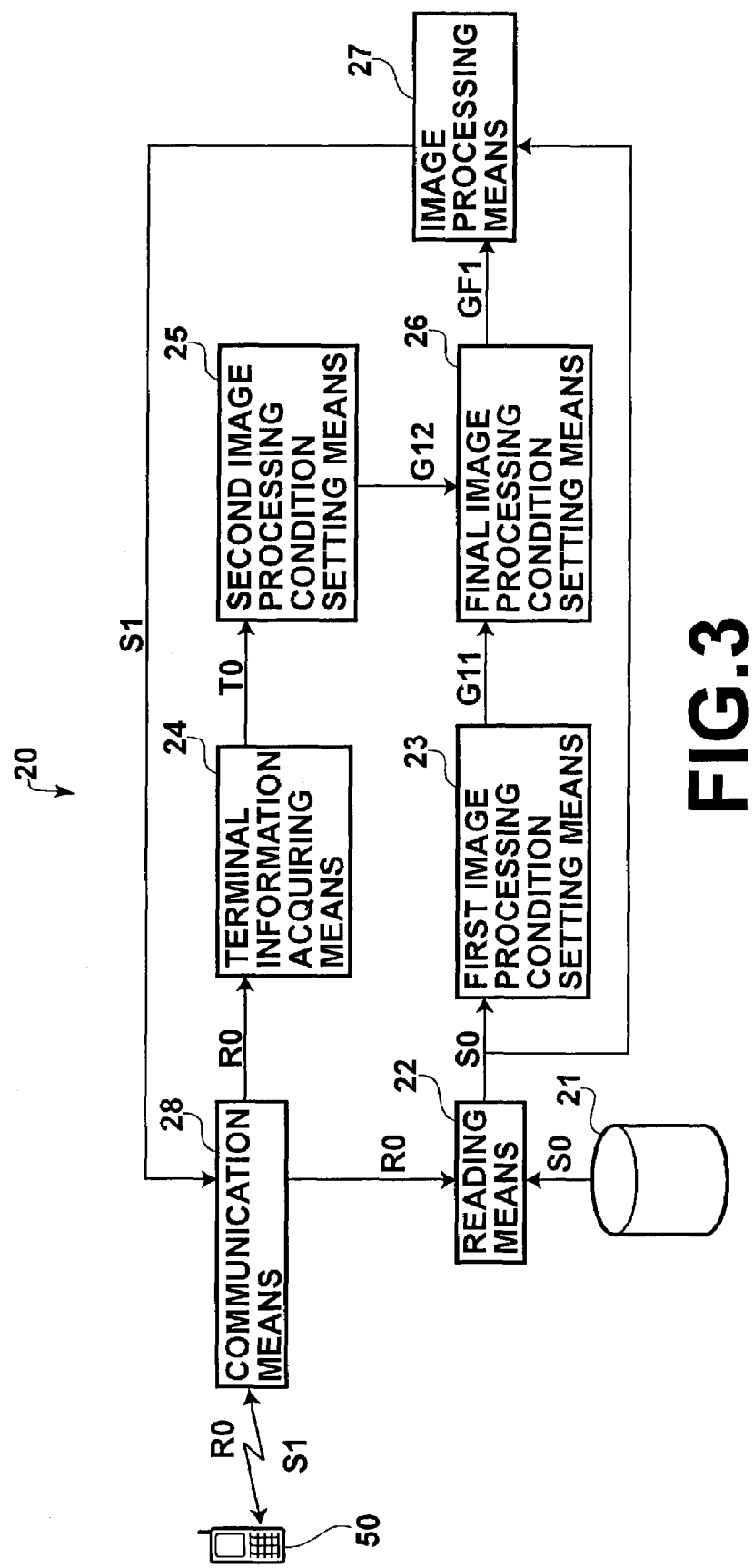
FIG. 3 is a schematic block diagram showing the constitution of an image processing apparatus according to a second embodiment of the present invention.

Next, a second embodiment of the present invention will be described. FIG. 3 is a schematic block diagram showing a constitution of an image processing apparatus of the second embodiment of the present invention. The image processing apparatus 20 according to the second embodiment of the present invention is one which performs the following steps. Image processing is carried out for the image data s0 in accordance with requests from a camera-equipped portable telephone 50 and processed image data s1 is obtained. The obtained processed data s1 is then transmitted to the camera-equipped portable telephone 50.

As shown in FIG. 3 the image processing apparatus 20 of the second embodiment of the invention includes: image data storage means 21 such as a hard disk for storing image data S0; reading means 22 for reading the image data S0 from the image storage means 21 in response to the request information R0, based on request information R0 sent from camera-equipped portable telephone 50 to request transmission of an image; first image processing condition setting means 23 for setting a first image processing condition G1 for carrying out image processing for the image data S0 after analyzing the image data S0 read from the image data storage means 21 by the reading means 22; terminal information acquiring means 24 for acquiring terminal information T0 containing a location of the camera-equipped portable telephone 50 contained in the request information R0, time of making the request and/or model information of the camera-equipped portable telephone 50; second image processing condition setting means 25 for setting a second image processing condition G12 for carrying out image processing for the image data S0 based on the terminal information T0; final image processing condition setting means 26 for setting a final image processing condition GF1 for carrying out image processing for the image data S0 based on the first and second image processing conditions G11, G12; image processing means 27 for carrying out image processing for the image data S0 based on the final image processing condition GF1 to obtain processed image data S1; and communication means 28 for receiving the request information R0 and transmitting the processed image data S1.

The camera-equipped portable telephone 50 is operated by a user to request transmission of desired image data S0 to the image processing apparatus 20 of the second embodiment. Specifically, in the camera-equipped portable telephone 50, the image data S0 requested to be transmitted is designated by specifying a file name of the image data S0 stored in the image data storage means 21. Thus, the request information R0 for requesting transmission of the image data S0 is generated in the camera-equipped portable telephone 50. In this case, the request information R0 contains terminal information including the location of the camera-equipped portable telephone 50, the time of making the request and/or the model information of the camera-equipped portable telephone 50 in addition to the file name of the image data S0 requested to be transmitted. Then, the user of the camera-equipped portable telephone 50 transmits the request information R0 to the image processing apparatus 20.

The image data storage means 21 stores a plurality of image data S0 generated by various image generating apparatus such as the camera-equipped portable telephone 50, a digital camera and the like.

The reading means 22 reads the image data S0 from the image data storage means 21 based on the file name of the image data S0 contained in the request information R0.

The first image processing condition setting means 23 analyzes the image data S0 by acquiring a histogram, a white point or the like from the read image data S0, and sets a first image processing condition G11 such as a tone processing condition, a density correction condition, a color conversion condition or the like.

The second image processing condition setting means 25 sets a second image processing condition G12 for carrying out image processing for the image data S0 based on the terminal information T0 contained in the request information R0. For example, if information of the location contained in the terminal information T0 is "indoor" and the time of making the request is at night, it is assumed that the image is seen at a dark location, therefore the second image processing condition G12 is set so as to set a tone for a high contrast.

If a model name of the camera-equipped portable telephone 50 is contained in the terminal information T0, the second image processing condition G12 is set so as to correct color based on characteristics of a display unit of the camera-equipped portable telephone 50. For example, if the display unit of the camera-equipped portable telephone 50 which has requested transmission of the image data S0 has red characteristics, the second image processing condition G12 is set to make the color bluish. In this case, a relation between the model information of the camera-equipped portable telephone 50 and the characteristics of the display unit is stored as a database in a memory (not shown). In the second image processing condition setting means 25, the second image processing condition G12 is set by referring to the database.

The final image processing condition 26 sets the final image processing condition GF1 based on the first and second image processing conditions G11, G12. Here, in the camera-equipped portable telephone 50, an image is displayed under various viewing environments such as various locations, time or the like, and depending on the environment in which the image is viewed the image may become difficult to view. Additionally, the way the image is seen may vary depending on characteristics of the model of the camera-equipped portable telephone 50. Thus, according to the second embodiment, based on the terminal information T0 of the camera-equipped portable telephone 50, the final image processing condition GF1 is decided by using both the second image processing condition G12 and the first image processing condition G11. Specifically, the second image processing condition G12 which takes into consideration the location of the camera-equipped portable telephone 50, the time of viewing the image and/or the characteristics of the model, and the first image processing condition G11 being acquired based on the image data S0.

For example, if the first image processing condition G11 is for setting a tone for a low contrast while the second image processing condition G12 is for setting a tone for a high contrast, the final image processing condition GF1 is set so as to set a tone for a high contrast taking the viewing environment of the image into consideration. If the first image processing condition G11 is for setting a tone for a high contrast, and the second image processing condition G12 is also for setting a tone for a high contrast, the final image processing condition GF1 is set so as to set an even higher contrast for the image.

The image processing means 27 carries out image processing for the image data S0 based on the final image processing condition GF1 to obtain processed image data S1.

The communication means 28 has a function which acts as a communication interface for receiving the request information R0 transmitted from the camera-equipped portable telephone 50, and transmitting the processed image data S1 to the camera-equipped portable telephone 50.

Figure 4:
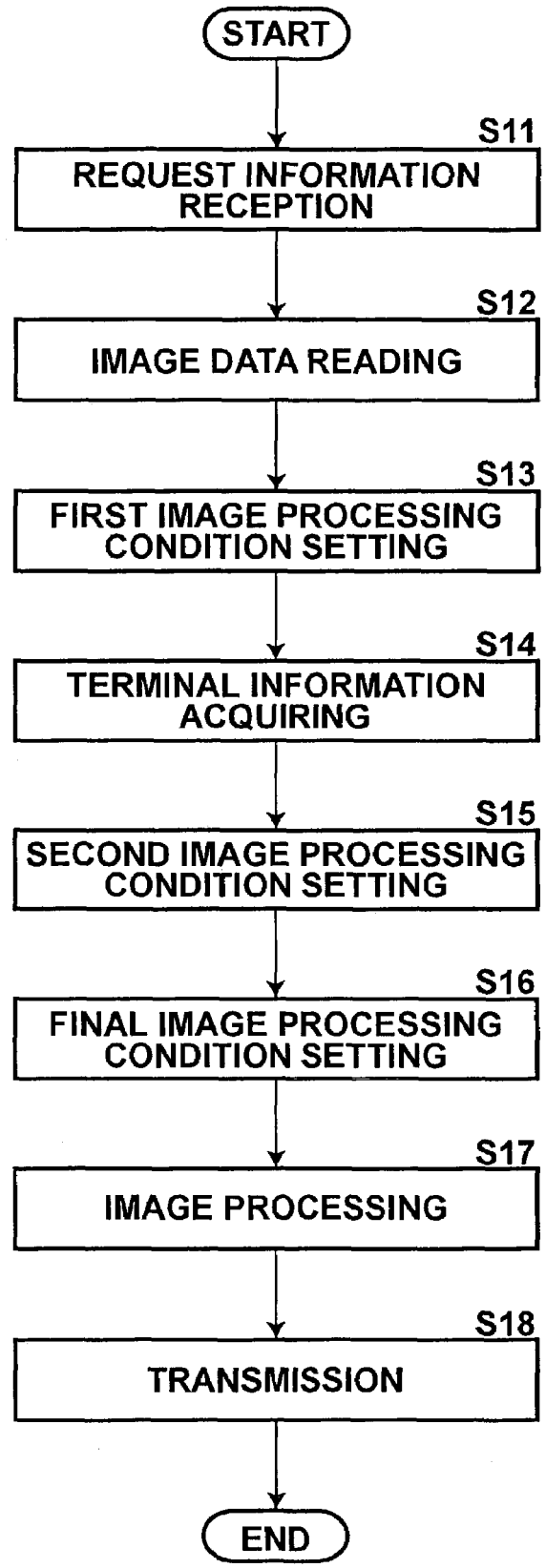
FIG. 4 is a flowchart showing a process carried out in the second embodiment.

Next, an operation of the second embodiment will be described. FIG. 4 is a flowchart showing a process carried out in the second embodiment. First, the communication means 28 receives the request information R0 transmitted from the camera-equipped portable telephone 50 (step S11), and the reading means 22 reads the image data S0 from the image data storage means 21 based on the file name of the image data S0 contained in the request information R0 (step S12). Then, the first image processing condition setting means 23 sets a first image processing condition G11 based on the image data S0 (step S13).

Meanwhile, the terminal information acquiring means 24 acquires terminal information T0 contained in the request information R0 (step S14). Then, the second image processing condition setting means 25 sets a second image processing condition G12 based on the terminal information T0 (step S15). Incidentally, the processes of steps S12 and S13, and the processes of steps S14 and S15 may be reversed or carried out in parallel.

Then, the final image processing condition setting means 26 sets a final image processing condition GF1 based on the first and second image processing conditions G11, G12 (step S16). Then, the image processing means 27 carries out image processing for the image data S0 based on the final image processing condition GF1 to obtain processed image data S1 (step S17). The processed image data S1 is transmitted to the camera-equipped portable telephone, and the process is finished. The processed image data S1 is then displayed on a display unit of the camera-equipped portable telephone 50.

Thus, according to the second embodiment, the final image processing condition GF1 is set based on the first image processing condition G11 which is set based on the image data S0, and the second image processing condition G12 which is set based on the terminal information T0.

In this case, on the camera-equipped portable telephone 50, the image is displayed under various display environments, various locations, times or the like, and the displayed image may become difficult to see depending on the environment in which the image is viewed. Additionally, even in the case of the same image, the way the image is seen may vary in accordance with characteristics of the model of the camera-equipped portable telephone 50.

According to the second embodiment, since the final image processing condition GF1 is decided by using both the first image processing condition G11 and the second image processing condition G12, in the camera-equipped portable telephone 50, it is possible to reproduce a clear image suited to its viewing environment and/or the characteristics of the model. Specifically, the first image processing condition G11 is acquired based on the image data S0, and the second image processing condition G12 takes into consideration the location of the camera-equipped portable telephone 50, the time of viewing the image and/or the characteristics of the model.

Figure 5:
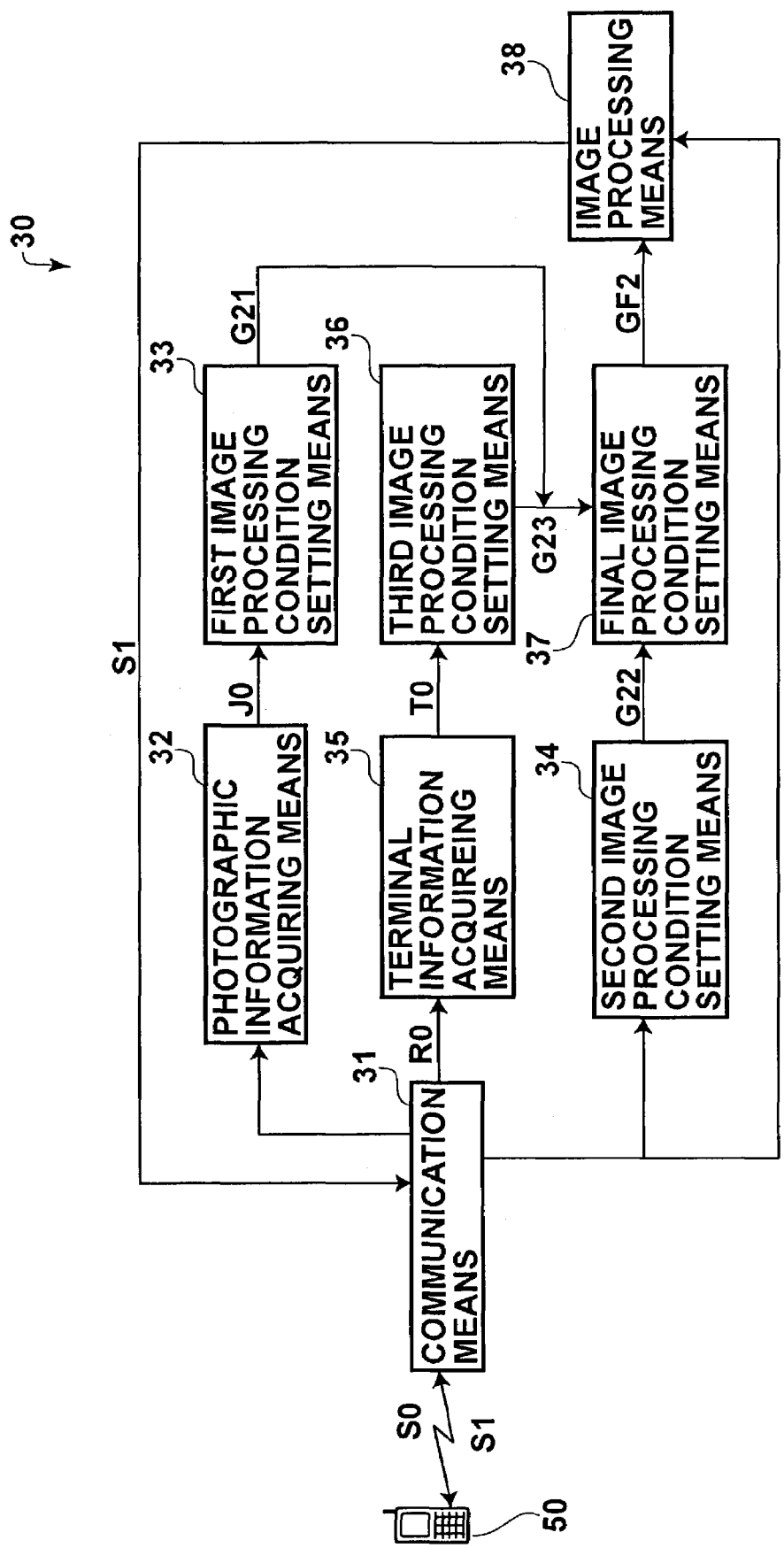
FIG. 5 is a schematic block diagram showing the constitution of an image processing apparatus according to a third embodiment of the present invention.

Next, a third embodiment of the present invention will be described. FIG. 5 is a schematic block diagram showing a constitution of an image processing apparatus of the third embodiment of the present invention. The image processing apparatus 30 according to the third embodiment of the present invention is one which performs the following steps. Image processing is carried out for the image data s0 transmitted from a camera-equipped portable telephone 50 and processed image data s1 is obtained. The obtained processed data s1 is then transmitted to the camera-equipped portable telephone 50.

As shown in FIG. 5, the image processing apparatus 30 of the third embodiment of the present invention includes: communication means 31 for receiving the image data S0 transmitted from the camera-equipped portable telephone 50 and transmitting the processed image data S1 to the camera-equipped portable telephone 50; photographic information acquiring means 32 for acquiring photographic information J0 containing a photographing location and photographing time added to the image data S0; first image processing condition setting means 33 for setting a first image processing condition G21 for carrying out image processing for the image data S0 based on the photographic information J0; second image processing condition setting means 34 for setting a second image processing condition G22 for analyzing the image data S0 and carrying out image processing for the image data S0; terminal information acquiring means 35 for acquiring terminal information T0 containing the location of the camera-equipped terminal telephone 50, the time making the request and/or model information of the camera-equipped portable telephone 50 added to the image data S0; third image processing condition setting means 36 for setting a third image processing condition G23 for carrying out image processing for the image data S0 based on the terminal information T0; final image processing condition setting means 37 for setting a final image processing condition GF2 for carrying out image processing for the image data S0 based on the first, second and third image processing conditions G21, G22, G23; and image processing means 38 for carrying out image processing for the image data S0 based on the final image processing condition GF2 to obtain processed image data S1.

The camera-equipped portable telephone 50 acquires the image data S0 by photography. Time of photography is added as photographing time, and furthermore location information of the nearest base station located to the camera-equipped portable telephone at the photographing time (relatively simple information such as an address, whether it is outdoor or indoor) is added as photographic information J0 into the header information or the tag information. Also, the terminal information T0 containing the location of the camera-equipped portable telephone 50, the time of transmitting the image data S0 and/or the model information of the camera-equipped portable telephone 50 is added as header information or tag information. Incidentally, since the camera installed in the camera-equipped portable telephone 50 is not one with very advanced functionality, an image represented by the image data S0 is not of such high quality.

The communication means 31 has a function which acts as a communication interface for receiving the image data S0 transmitted from the camera-equipped portable telephone 50, and transmitting the processed image data S1 to the camera-equipped portable telephone 50.

The photographic information acquiring means 32 acquires photographic information J0 added to the images data S0 similar as in the case of the photographic information acquiring means 12 of the first embodiment.

The first image processing condition setting means 33 sets a first image processing condition G21 for carrying out image processing for the image data based on the photographic information J0 similar as in the case of the first image processing condition setting means 13 of the first embodiment.

The second image processing condition setting means 34 analyzes the image data S0 and sets a second image processing condition G22 such as a tone processing condition, a density correction condition or a color conversion condition for carrying out image processing for the image data S0 similar as in the case of the second image processing condition setting means 14 of the first embodiment and the first image processing condition setting means 23 of the second embodiment.

The terminal information acquiring means 35 acquires the terminal information T0 added to the image data S0.

The third image processing condition setting means 36 sets a third image processing condition G23 for carrying out image processing for the image data S0 based on the terminal information T0 similar as in the case of the second image processing condition setting means 25 of the second embodiment.

Figure 6:
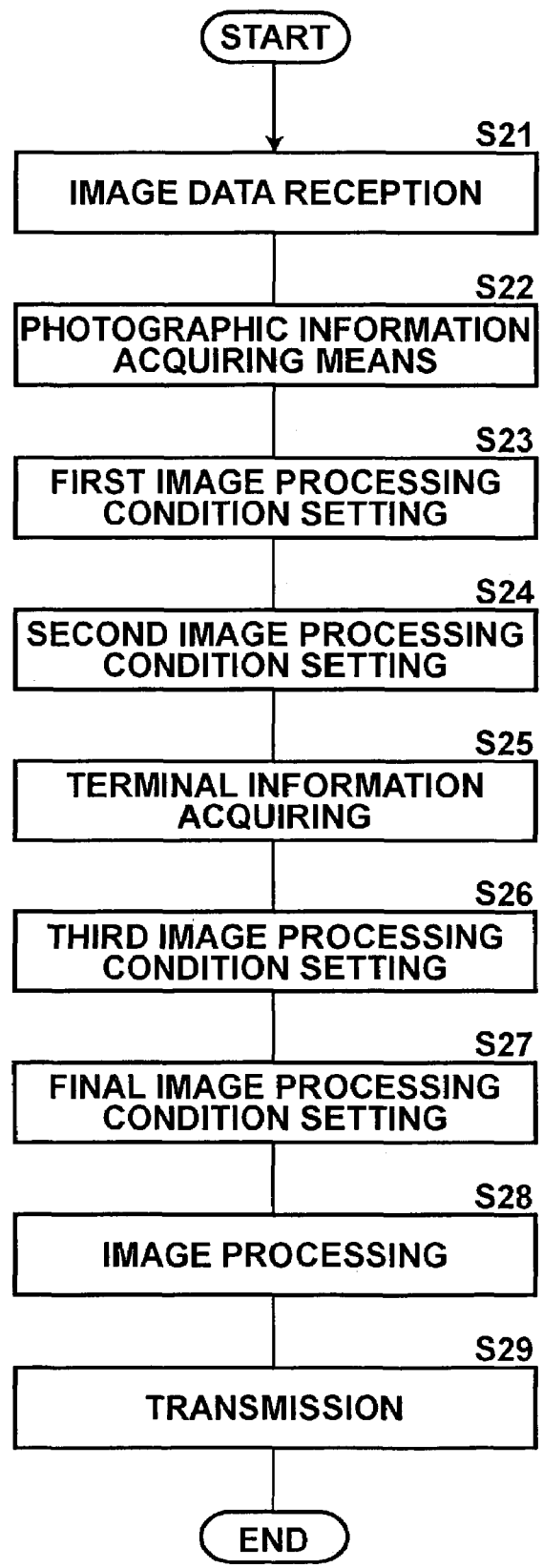
FIG. 6 is a flowchart showing a process carried out in the third embodiment.

Next, an operation of the third embodiment will be described. FIG. 6 is a flowchart showing a process carried out in the third embodiment. First, the communication means 31 receives the image data S0 transmitted from the camera-equipped portable telephone 50 (step S21), and the photographic information acquiring means 32 acquires the photographic information J0 added to the image data S0 (step S22). Then, the first image processing condition setting means 33 sets a first image processing condition G21 based on the photographic information J0 (step S23).

Meanwhile, the second image processing condition setting means 34 sets a second image processing condition G22 based on the image data S0 (step S24).

Further, the terminal information acquiring means 35 acquires the terminal information T0 added to the image data S0 (step S25). Then, the third image processing condition setting means 36 sets a third image processing condition G23 based on the terminal information T0 (step S26). Incidentally, the order of the processes of steps S22 and S23, the processing of step S24, and the processes of steps S25 and S26 may be changed. Also, the processes of steps S22 and S23, the processing of step S24, and the processes of steps S25 and S26 may be carried out in parallel.

Then, the final image processing condition setting means 37 sets a final image processing condition GF2 based on the first, second and third image processing conditions G21, G22, G23 (step S27). Then, the image processing means 38 carries out image processing for the image data S0 based on the final image processing condition GF2 to obtain processed image data S1 (step S28). The processed image data S1 is transmitted from the communication means 31 to the camera-equipped portable telephone 50 (step S29), and the process is finished. The processed image data S1 is displayed on a display unit of the camera-equipped portable telephone 50.

Thus, according to the third embodiment, the final image processing condition GF2 is set based on the first image processing condition G21 which is set based on the photographic image J0, the second image processing condition G22 which is set based on the image data S0, and the third image processing condition G23 which is set based on the terminal information T0.

Since the camera installed in the camera-equipped portable telephone 50 is not one with very advanced functionality, it is often the case that just the photographic information of the photographing location and the photographing time is acquired. Also, since an image represented by the image data S0 acquired in the camera is not of such high quality, there is a limit to image processing if just the second image processing condition G22 acquired based on the image data S0 is used. According to the third embodiment, since the image processing is carried out for the image data S0 by setting the final image processing condition GF2, based on the first image processing condition G21, the second image processing condition G22 and the third image processing condition G23 even in the case of the image data S0 being acquired in the camera with not very advanced functionality similar to the camera installed in the camera-equipped portable telephone 50, it is possible to obtain processed image data S1 for enabling reproduction of a high-quality image. Specifically, the first image processing condition G22 being set based on the photographic information J0, the second image processing condition. G22 being set based on the image data S0 and the third image processing condition G23 being set based on the terminal information T0.

Additionally, in the camera-equipped portable telephone 50, the image is displayed under various display environments, various locations, times or the like, and the displayed image may become difficult to see depending on the environment of the image viewed. Even in the case of the same image, the way the image is seen may vary in accordance with characteristics of the model of the camera-equipped portable telephone 50. According to the third embodiment, since the image processing is carried out by setting the final image processing condition GF2 based on the third image processing condition G23 which takes the location of the camera-equipped portable telephone 50, the observation time of the image and/or the model into consideration, in the camera-equipped portable telephone 50 it is possible to reproduce a clear image suited to its viewing environment and/or the characteristics of the model.

Figure 7:
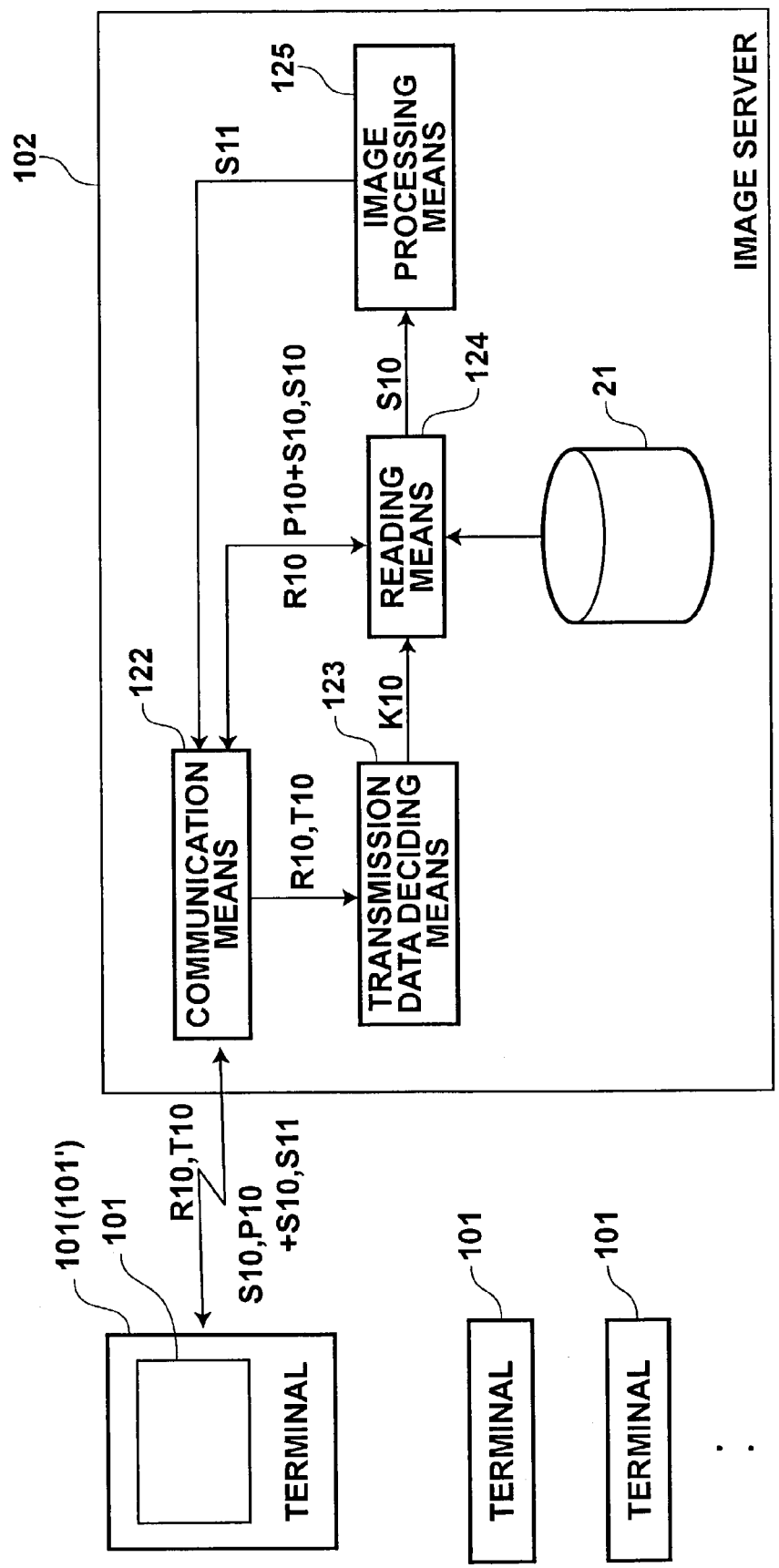
FIG. 7 is a schematic block diagram showing the configuration of an image processing system to which a data transmission apparatus of a fourth embodiment of the present invention is applied.

Next, description will be made of a data transmission method and a data transmission apparatus of the present invention. FIG. 7 is a schematic block diagram showing a configuration of an image processing system to which a data transmission apparatus of a fourth embodiment of the present invention is applied. As shown in FIG. 7, the image processing system of the fourth embodiment transfers data or information back and forth between a terminal 101 such as a portable telephone owned by a user and an image server 102 which stores various data such as image data, an image processing application program or the like.

The terminal 101 of the user includes a communication interface for enabling communication with the image server 102, and has a function for requesting transmission of image data stored in the image server 102 by operating an input means such as input keys, or receiving the image data transmitted from the image server 102 and displaying it on a monitor 101A. Additionally, certain models of the terminal 101 have a function for installing an application program and executing various processes by the application program. In the case of requesting transmission of image data, transmission request information R10 containing a file name or the like of the image data requested to be transmitted and terminal information T10 indicating a model of the terminal 101 are generated, and transmitted to the image server 102. The terminal information T10 may be contained in the transmission request information R10 when transmitted to the image server 102.

The image server 102 includes: data storage means 121 constituted of a hard disk or RAID storing a plurality of image data and data consisting of an image processing application program P10; communication means 122 constituted of a communication interface for receiving the transmission request information R10 and the terminal information T10 transmitted from the terminal 101 and transferring various data such as the image data S10 requested to be transmitted; transmission data deciding means 123 for determining a model of the terminal which has requested the transmission of the image data based on the terminal information T10 (referred to as request terminal 101', hereinafter) and for deciding a type of data transmitted to the request terminal 101' to output decision information K10, reading means 124 for reading necessary data from the data storage means 121 and inputting it to the communication means 122 based on the transmission request information R10 and the decision information K10 outputted from the transmission data deciding means 123, and image processing means 125 for carrying out image processing for the image data S10 requested to be transmitted to obtain processed image data S11 when necessary.

The transmission deciding means 123 first determines whether or not the transmission request information R10 contains information indicating the transmission of the processed image data S11 which is acquired by carrying out image processing for the image data S10 at the image processing means 125. Then, if the information indicating the transmission of the processed image data S11 is contained in the transmission request information R10, the processed image data S11 is decided to be data that is to be transmitted to the request terminal 101' (first data D1).

On the other hand, if the information indicating the transmission of the processed image data S11 is not contained in the transmission request information R10, based on the terminal T10, a determination is made as to a model of the request terminal 101' which transmitted the transmission request information R10. Then, if the request terminal 101' is a low-order model which cannot install an image processing application program P10 and cannot execute image processing by itself, the first data D1 is decided to be data that is to be transmitted to the request terminal 101'.

Conversely, if the request terminal 101' is a high-order model which can execute image processing itself by installing the image processing application program P10, a determination is further made as to whether the image processing application program P10 has been transmitted to the request terminal 101' or not. If the image processing application program P10 has not been transmitted, the image data S10 requested to be transmitted and the image processing application program P10 for carrying out image processing for the image data S10 are decided to be data that is to be transmitted (second data D2).

On the other hand, if it is determined that the image processing application program P10 has been transmitted, since it is not necessary to transmit the image processing application program P10 again, only the image data S10 is decided to be data that is to be transmitted (third data D3).

After the type of data to be transmitted to the request terminal 101' has been decided in the aforementioned manner, decision information K10 indicating the decided type of data is generated and inputted to the reading means 124.

The reading means 124 reads necessary data from the data storage means 121 based on the decision information K10. That is, if the transmission of first data D1 has been decided, then just the requested data S10 is read from the data storage means 121 based on the transmission request information R10 and inputted to the image processing means 125. On the other hand, if the transmission of the second data D2 has been decided, then the requested image data S10 as well as the image processing application program P10 are read from the data storage means 121, and inputted to the communication means 122. Further, if the transmission of third data D3 has been decided, then just the requested image data S10 is read from the data storage means 121 and inputted to the communication means 122.

The image processing means 125 carries out image processing such as tone processing, color correction, density correction, sharpness processing, or white balance adjustment for the image data S10 to generate processed image data S11. The processed image data S11 is inputted to the communication means 122.

Figure 8:
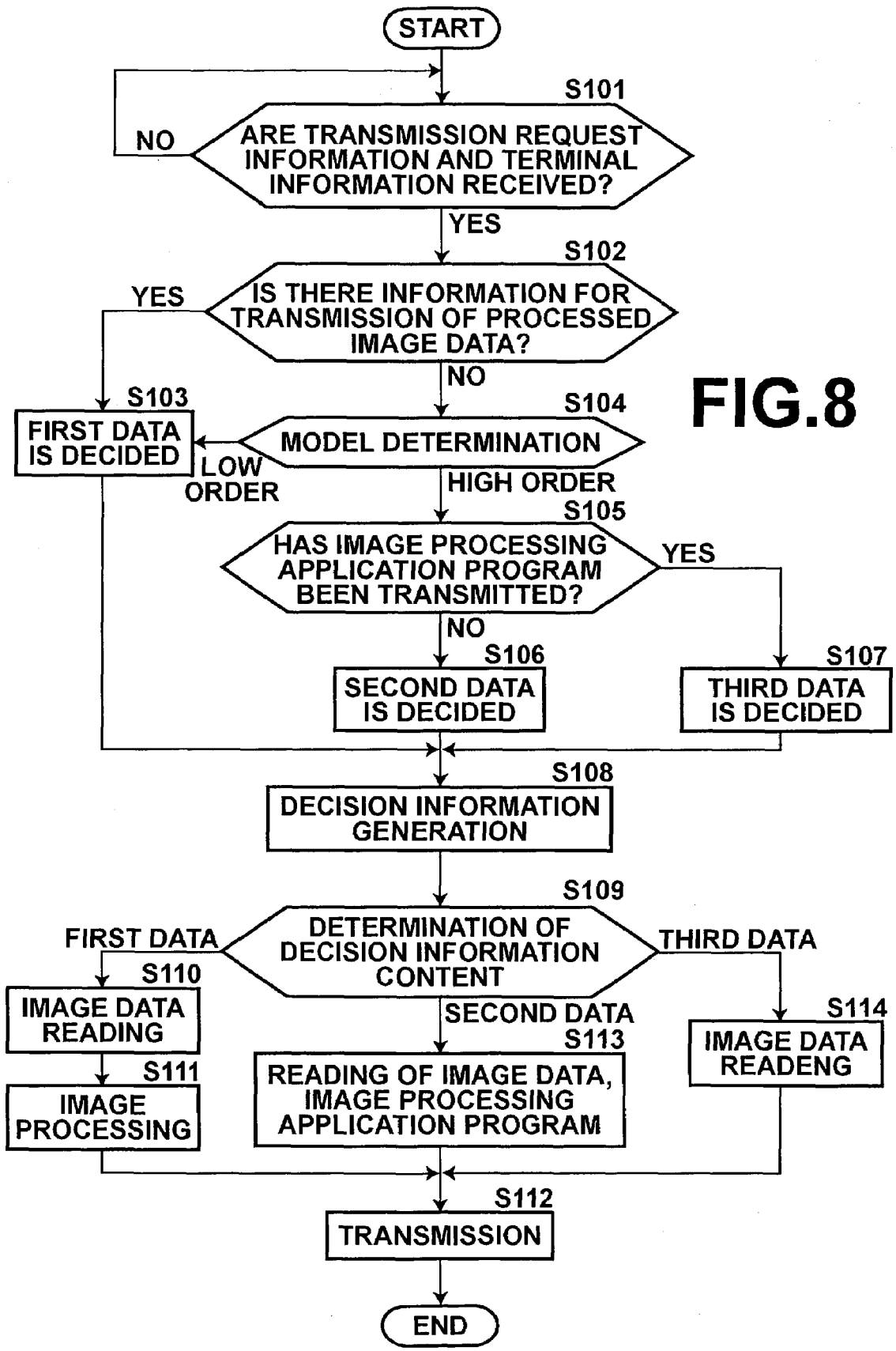
FIG. 8 is a flowchart showing a process carried out in the fourth embodiment.

Next, an operation of the fourth embodiment will be described. FIG. 8 is a flowchart showing a process carried out in the fourth embodiment. First, determination is made as to whether the transmission request information R10 and the terminal information T10 transmitted from the terminal 101 have been received or not (step S101). If the determination at step S101 is positive, at the transmission data deciding means 123, determination is made as to whether information indicating transmission of the processed image data S11 is contained in the transmission request information R10 or not (step S102). If the determination at step S102 is positive, the first data D1 consisting of the processed image data S11 is decided to be data that is to be transmitted to the request terminal 101' (step S103).

On the other hand, if the determination at step S102 is negative, a determination is made as to a model of the request terminal 101' which has transmitted the transmission request information R10 based on the terminal information T10 (step S104). Then, if the request terminal 101 is determined to be a low-order model, the first data D1 is decided to be data that is to be transmitted to the request terminal 101' (step S103).

Conversely, if the request terminal 101' is determined to be a high-order model, a determination is made as to whether the image processing application program P10 has been transmitted to the request terminal 101' or not (step S105). If the image processing application program P10 has not been transmitted and accordingly the determination at step S105 is negative, the second data D2 consisting of the image data S10 requested to be transmitted and the image processing application program P10 for carrying out image processing for the image data S10 is decided to be data that is to be transmitted (step S106)

If the determination at step S105 is positive, since the image processing application program P10 has been transmitted and it is accordingly unnecessary to transmit the image processing application program P10 to the request terminal 101' again, the third data D3 consisting of only the image data S10 is decided to be data that is to be transmitted to the request terminal 101' (step S107).

Then, decision information K10 indicating the decided type of data is generated (step S108).

Subsequently, at the reading means 124, a content of the decision information K10 is determined (step S109). If transmission of the first data D1 has been decided, then only the requested image data S10 is read from the data storage means 121 based on the transmission request information R10 (step S110). The read image data S10 is subjected to image processing at the image processing means 125 to obtain processed image data S11 (step S111). The processed image data S11 is transmitted from the communication means 122 to the request terminal 101' (step S112), and the process is finished.

At the request terminal 101', the processed image data S11 is displayed on a monitor 1A thereof.

On the other hand, if transmission of the second data D2 has been decided, the requested image data S10 and the image processing application program P10 are read from the data storage means 121 (step S113). The read image data S10 and the image processing application program P10 are transmitted from the communication means 122 to the request terminal 101' (step S112), and the process is finished.

At the request terminal 101', the image processing application program P10 is installed therein and image processing is carried out for the transmitted image data S10 to obtain processed image data S11. Then, the processed image data S11 is displayed on the monitor 1A.

Further, if transmission of the third data D3 has been decided, then only the requested image data S10 is read from the data storage means 121 (step S114).

The read image data S10 is transmitted from the communication means 122 to the request terminal 101' (step S112), and the process is finished.

At the request terminal 101', by the image processing application P10 installed in the request terminal 101', image processing is carried out for the transmitted image data S10 to obtain processed image data S11, which is then displayed on the monitor 1A.

Thus, according to the fourth embodiment, the type of data that is to be transmitted to the request terminal 101' which transmitted the transmission request information R10, is decided from the first to third data, D1 to D3, based on the terminal information T10. Thus, the image processing application program P10 and the requested image data S10, not the processed image data S11, are transmitted to the terminal 101 capable of executing image processing by installing the image processing application program P10. Therefore, it is not necessary to carry out image processing in the image server 102 and compared with the case of transmitting the processed image data S11 to all the terminals 101, a processing load on the image server 102 can be reduced.

If information indicating transmission of the processed image data S11 is contained in the transmission request information R10, since the processed image data S11 is transmitted even if the request terminal 101' is a high-order model, it is possible to satisfy the request of the user who has transmitted the transmission request information R10.

Further, in the case that the request terminal 101' is the high-order model, if the image processing application P10 has been transmitted to the request terminal 101', only the image data S10 is transmitted, without the image processing application program P10. Thus, retransmission of the image processing application program P10 to the same terminal 101 is eliminated, whereby meaningless transmission of data from the image server 102 is prevented to enable efficient data transmission.

In the aforementioned fourth embodiment, since the model of the terminal 101 which requests transmission of the image data S10 is known, it may be known that the image processing application program P10 has been transmitted from the image server 102 if the transmission request information R10 is transmitted. In this case, the image processing includes various processing contents such as tone processing, color correction, density correction, sharpness processing, white balance adjustment and the like. Thus, if transmission of the image processing application program P10 is known at the terminal 101, a necessary processing function may be selected. For the selection of the processing function, a necessary image processing function can be contained in the transmission request information R10. In this case, at the reading means 124, the image processing application program P10 is read in accordance with the processing function contained in the transmission request information R10, and inputted to the communication means 122.

On the other hand, an adjective word such as "vivid" or "clear" explaining a desired image quality may be contained in the transmission request information R10. At the reading means 124, a necessary processing function may be selected in accordance with the word contained in the transmission request information R10, the image processing application P10 maybe read in accordance with the selected processing function, and inputted to the communication means 122.

Figure 9:
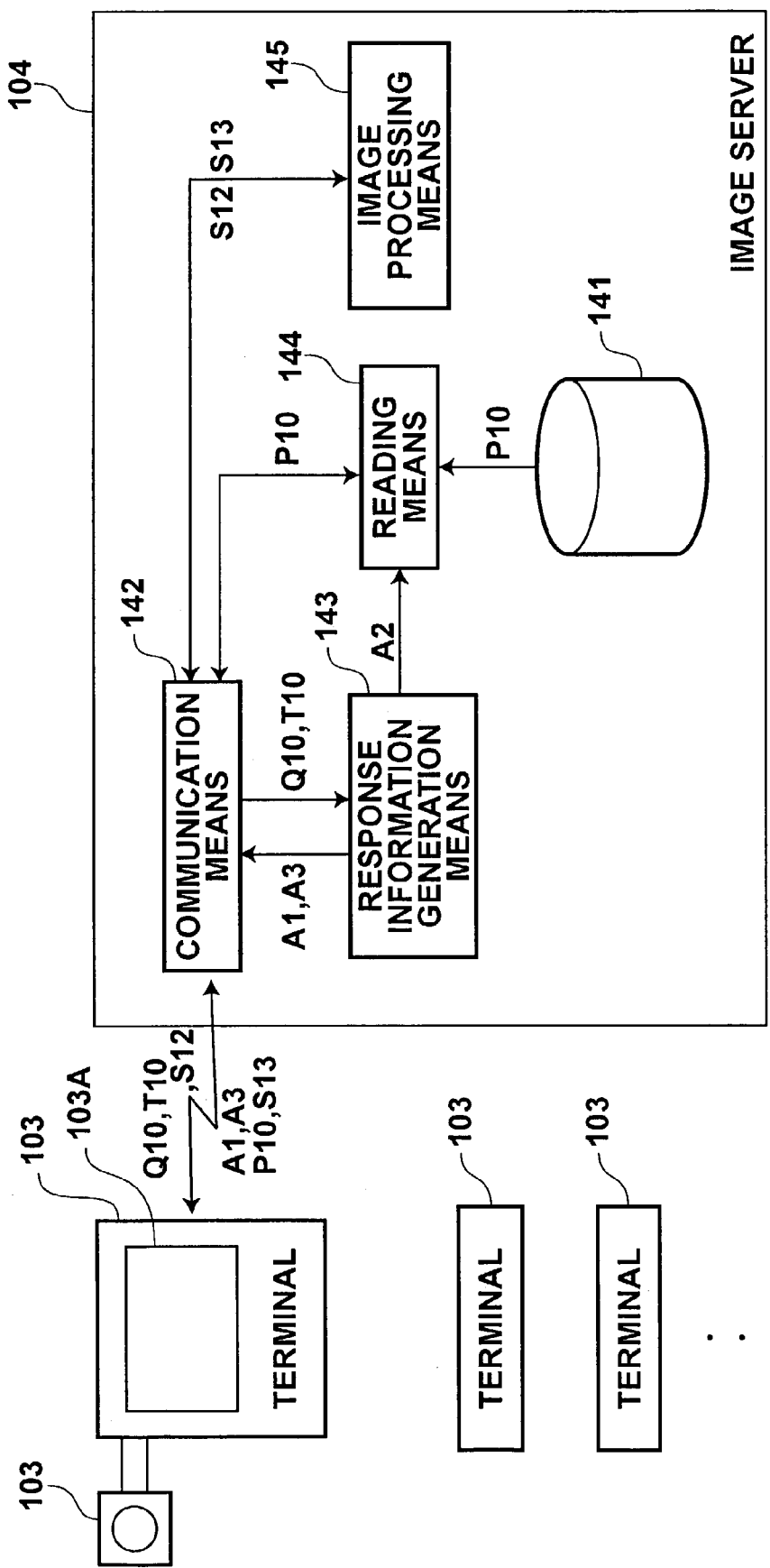
FIG. 9 is a schematic block diagram showing the configuration of an image processing system to which a data transmission apparatus of a fifth embodiment of the present invention is applied.

Next, a fifth embodiment of the present invention will be described. FIG. 9 is a schematic block diagram showing a configuration of an image processing system to which a data transmission apparatus of the fifth embodiment of the present invention is applied. As shown in FIG. 9, the image processing system of the fifth embodiment transfers data or information back and forth between a camera-equipped terminal 103 such as a camera-quipped portable telephone owned by a user and an image server 104 which stores various data such as image data, an image processing application program or the like.

The camera-equipped terminal 103 of the user includes a communication interface for enabling communication with the image server 104, a monitor 103A for handling various displays, and a camera 103B for acquiring image data S12 by photographing. Also having a function for transmitting the image data S12 acquired by photographing by the user operating an input means such as an input key, and inquiry information Q10 for inquiring about advisability of image processing. There are certain models of the terminal 103 which have a function for installing an application program and executing various processes from the application program. In the case of transmitting the inquiry information Q10, terminal information T10 indicating the model of the terminal 103 is generated, and transmitted to the image server 104. The terminal information T10 may be contained in the inquiry information Q10 when transmitted to the image server 104.

The image server 104 includes: data storage means 141 constituted of a hard disk or RAID which store a plurality of image data and data consisting of an image processing application program P10; communication means 142 constituted of a communication interface for receiving the inquiry information Q10 and the terminal information T10 transmitted from the terminal 103 and transferring various data such as image data; response information generation means 143 for determining a model of a terminal (referred to as request terminal 103', hereinafter) which has transmitted the inquiry information Q10 based on the terminal information T10, and generating response information A1 to A3 indicating responses to the inquiry; reading means 144 for reading the image processing application program P10 from the data storage means 141 based on the later-described response information A2; and image processing means 145 for carrying out image processing for the image data S12 transmitted from the later-describe request terminal 103' to obtain processed image data S13.

The response information generation means 143 determines the model of the request terminal 103' which has transmitted the inquiry information Q10 based on the terminal information T10. Then, if the request terminal 103' is a low-order model which cannot install an image processing application program P10 and cannot execute image processing by itself, the first response information A1 containing information indicating transmission request of the image data S12 acquired by photographing at the request terminal 103' is generated, and inputted to the communication means 142.

Conversely, if the request terminal 103' is a high-order model which can execute image processing itself by installing the image processing application program P10, determination is further made as to whether the image processing application program P10 has been transmitted to the request terminal 103' or not. If the image processing application program P10 has not been transmitted, at the request terminal 103', the second response information A2 containing information indicating that the image processing application program P10 for carrying out image processing for the image data S12 is to be transmitted, is generated, and inputted to the communication means 144.

On the other hand, if it is determined that the image processing application program P10 has been transmitted, it is not necessary to transmit the image processing application program P10 again to the request terminal 103'. Therefore, at the request terminal 103', since image processing is executable therein, the third response information A3 containing information indicating nonnecessity of transmission of the image data S12 is generated, and inputted to the communication means 142.

After the entry of the second response information A2, the reading means 144 reads the image processing application P10 from the data storage means 141, which is then inputted to the communication means 142.

The image processing means 145 carries out image processing such as tone processing, color correction, density correction, sharpness processing, or white balance adjustment for the image data S12 transmitted from the request terminal 103' to generate processed image data S13. The processed image data S13 is inputted to the communication means 142.

Figure 10:
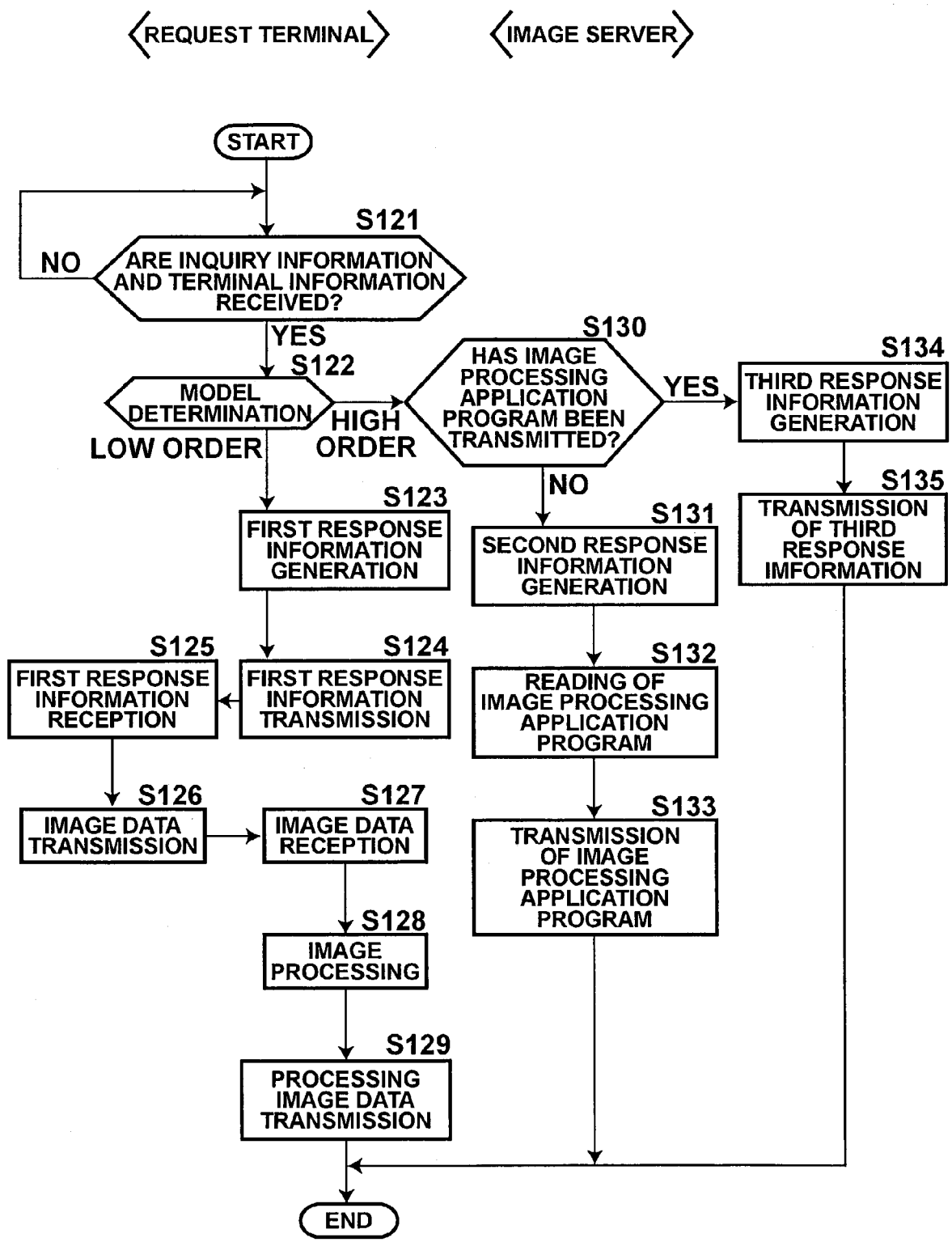
FIG. 10 is a flowchart showing a process carried out in the fifth embodiment.

Next, an operation of the fifth embodiment will be described. FIG. 10 is a flowchart showing a process carried out in the fifth embodiment. First, determination is made as to whether the inquiry information Q10 and the terminal information T10 transmitted from the terminal 103 have been received or not (step S121). If the determination at step S121 is positive, based on the terminal information T10, determination is made at the response information generation means 143 as to a model of the request terminal 103' which has transmitted the inquiry information Q10 (step S122) If the request terminal 103' is determined to be a low-order model, the first response information A1 is generated (step S123). The generated first response information A1 is transmitted from the communication means 142 to the request terminal 103' (step S124).

At the request terminal 103', the first response information A1 is received (step S125), and the image data S12 acquired by photographing is transmitted to the image server 104 based on the first response informational (step S126). At the image server 104, the image data S12 is received (step S127) and, at the image processing means 145, image processing is carried out for the image data S12 to obtain processed image data S13 (step S128). The processed image data S13 is transmitted from the communication means 142 to the request terminal 103' (step S129), and the process is finished.

At the request terminal 103', the processed image data S13 is displayed on the monitor 103A of the request terminal 103'.

On the other hand, if the request terminal 103' is determined to be a high-order model, a determination is made as to whether the image processing application program P10 has been transmitted to the request terminal 103' or not (step S130). If the image processing application program P10 has not been transmitted and accordingly the determination of step S130 is negative, the response information A2 is generated (step S131), and inputted to the reading means 144. At the reading means 144, the image processing application program P10 is read from the data storage means 141 (step S132). The read image processing application program P10 is transmitted from the communication means 142 to the request terminal 103' (step S133), and the process is finished.

At the request terminal 103', the image processing application program P10 is installed. At the request terminal 103', image processing is carried out for the image data S12 acquired by photographing to obtain processed image data S13, and this processed image data S13 is displayed on the monitor 103A.

If the determination of step S130 is positive, since the image processing application program P10 has been transmitted and it is accordingly unnecessary to transmit the image processing application program P10 again, the third response information A3 is generated (step S134), and transmitted from the communication means 142 to the request terminal 103', and the process is finished.

At the request terminal 103', image processing is carried out for the image data S12 acquired at the request terminal 103' to obtain processed image data S13 by the image processing application program P10 installed in the request terminal 103', and this processed image data S13 is displayed on the monitor 103A.

Thus, according to the fifth embodiment, based on the terminal information T0, a decision is made as to whether transmission of image data S12 has been requested from the request terminal 103' which transmitted the inquiry information Q10 or whether the image processing application program P10 is to be transmitted from the image server 104. Therefore, only the image processing application program P10 is transmitted to the camera-equipped terminal 103 capable of executing image processing by the image processing application program P10. Accordingly, it is not necessary to transmit the image data S12 from the camera-equipped terminal 103 to the image server 104, whereby communication expenses of transmitting the image date S12 from the terminal can be saved. Moreover, it is not necessary to carry out image processing in the image server 104 and, compared with the case of transmitting the processed image data S13 to all the terminals 103, a processing load on the image server 104 can be reduced.

In the fifth embodiment, since the model of the terminal 103 which transmits the inquiry information Q10 is known, if the inquiry information Q10 is transmitted, it may be known that the image processing application program P10 is to be transmitted from the image server 104. Here, the image processing includes various processing contents such as tone processing, color correction, density correction, sharpness processing, white balance adjustment and the like. Thus, if transmission of the image processing application program P10 is known at the terminal 103, necessary processing function may be selected. For the selection of the processing function, a necessary image processing function only needs to be contained in the inquiry information Q10. At the reading means 144, the image processing application program P10 is read in accordance with the processing function contained in the inquiry information Q10, and inputted to the communication means 142.

On the other hand, an adjective word such as "vivid" or "clear" explaining a desired image quality may be contained in the inquiry information Q10. At the reading means 144, a necessary processing function may be selected in accordance with the word contained in the inquiry information Q10, the image processing application P10 may be read in accordance with the selected processing function, and inputted to the communication means 142.

Furthermore, in the fourth and fifth embodiments, at the image servers 102, 104, latest versions can always be stored with regards to various application programs such as the image processing application programs installed in the terminals 101, 103. The versions of the application programs installed in the terminals 101, 103 may be contained in the terminal information T10 and transmitted to the image serves 102, 104. At the image servers 102, 104, the versions of the application programs installed in the terminals 101, 103 may be determined based on the terminal information T10. If the versions of the application programs installed in the terminals 101, 103 are not the latest, application programs of the latest versions may be transmitted to the terminals 101, 103 in accordance with the models of the terminals 101, 103.

What is claimed is:

1. An image processing method for acquiring processed image data by carrying out image processing under predetermined image processing conditions for image data to which photographic information containing a photographing location and photographing time is added, comprising the steps of:
   acquiring the photographic information from the image data;
   setting a first image processing condition for the image processing based on the photographic information;
   setting a second image processing condition for the image processing based on the image data; and
   setting the predetermined image processing conditions based on the first and second image processing conditions,
   wherein the photographing location comprises any of a latitude and longitude obtained by a global positioning system function, a location of a base station of a camera-equipped portable terminal nearest to the location where a photograph was taken, and a fact that a portable terminal is located indoors.

2. The image processing method according to claim 1, wherein the image processing method accounts for both the photographing location and the photographing time when setting the first image processing condition for the image processing.

3. An image processing method for reading image data stored in image storage means, carrying out image processing under predetermined image processing conditions for the read image data to obtain processed image data, and transmitting the processed image data to a portable terminal which requests transmission of the processed image data, comprising the steps of:
   acquiring terminal information containing any of a location of the portable terminal, a time of making the transmission request and model information of the portable terminal;
   setting a first image processing condition for the image processing based on the terminal information;
   setting a second image processing condition for the image processing based on the image data; and
   setting the predetermined image processing conditions based on the first and second image processing conditions.

4. The image processing method according to claim 3, wherein the portable terminal is camera-equipped.

5. An image processing method for acquiring processed image data by carrying out image processing under predetermined image processing conditions, for image data acquired by a camera-equipped portable terminal, to which photographic information containing a photographing location and photographing time is added, and transmitting the processed image data to the camera-equipped portable terminal, comprising the steps of:
   acquiring the photographic information from the image data;
   setting a first image processing condition for the image processing based on the photographic information;
   setting a second image processing condition for the image processing based on the image data;
   acquiring terminal information containing any of a location of the camera-equipped portable terminal, a time of making a transmission request and model information of the camera-equipped portable terminal;
   setting a third image processing condition for the image processing based on the terminal information; and
   setting the predetermined image processing conditions based on the first, second and third image processing conditions,
   wherein the photographing location comprises any of a latitude and longitude obtained by a global positioning system function, a location of a base station of a camera-equipped portable terminal nearest to the location where a photograph was taken, and a fact that a portable terminal is located indoors.

6. The image processing method according to claim 5, wherein the image processing method accounts for both the photographing location and the photographing time when setting the first image processing condition for the image processing.

7. An image processing apparatus including processing means for acquiring processed image data by carrying out image processing, under predetermined image processing conditions, for image data to which photographic information containing a photographing location and photographing time are added, an image processing apparatus comprising:
  photographic information acquiring means for acquiring the photographic information from the image data;
  first image processing condition setting means for setting a first image processing condition for the image processing based on the photographic information;
  second image processing condition setting means for setting a second image processing condition for the image processing based on the image data; and
  final image processing condition setting means for setting the predetermined image processing conditions based on the first and second image processing conditions,
  wherein the photographing location comprises any of a latitude and longitude obtained by a global positioning system function, a location of a base station of a camera-equipped portable terminal nearest to the location where a photograph was taken, and a fact that a portable terminal is located indoors.

8. The image processing apparatus according to claim 7, wherein the first image processing condition setting means accounts for both the photographing location and the photographing time when setting the first image processing condition for the image processing.

9. An image processing apparatus including reading means for reading image data stored in image storage means, processing means for carrying out image processing for the read image data under predetermined image processing conditions to obtain processed image data, and communication means for transmitting the processed image data to a portable terminal which requests transmission of the processed image data, an image processing apparatus comprising:
  terminal information acquiring means for acquiring terminal information containing any of a location of the portable terminal, a time of making the transmission request and model information of the portable terminal;
  first image processing condition setting means for setting a first image processing condition for the image processing based on the terminal information;
  second image processing condition setting means for setting a second image processing condition for the image processing based on the image data; and
  final image processing condition setting means for setting the predetermined image processing conditions based on the first and second image processing conditions.

10. The image processing apparatus according to claim 9, wherein the portable terminal is camera-equipped.

11. An image processing apparatus including processing means for acquiring processed image data by carrying out image processing under predetermined image processing conditions, for image data acquired by a camera-equipped portable terminal, to which photographic information containing a photographing location and photographing time is added, and communication means for transmitting the processed image data to the camera-equipped portable terminal, an image processing apparatus comprising:
  photographic information acquiring means for acquiring the photographic information from the image data;
  first image processing setting means for setting a first image processing condition for the image processing based on the photographic information;
  second image processing condition setting means for setting a second image processing condition for the image processing based on the image data;
  terminal information acquiring means for acquiring terminal information containing any of the location of the portable terminal, the time of making the transmission request and the model information of the portable terminal;
  third image processing condition setting means for setting a third image processing condition for the image processing based on the terminal information; and
  final image processing condition setting means for setting the predetermined image processing conditions based on the first, second and third image processing conditions,
  wherein the photographing location comprises any of a latitude and longitude obtained by a global positioning system function, a location of a base station of a camera-equipped portable terminal nearest to the location where a photograph was taken, and a fact that a portable terminal is located indoors.

12. The image processing apparatus according to claim 11, wherein the first image processing condition setting means accounts for both the photographing location and the photographing time when setting the first image processing condition for the image processing.

13. A program for making a computer execute an image processing method for acquiring processed image data by carrying out image processing, under predetermined image processing conditions, for image data to which photographic information containing a photographing location and photographing time is added, comprising the steps of:
  acquiring the photographic information from the image data;
  setting a first image processing condition for the image processing based on the photographic information;
  setting a second image processing condition for the image processing based on the image data; and
  setting the predetermined image processing conditions based on the first and second image processing conditions,
  wherein the photographing location comprises any of a latitude and longitude obtained by a global positioning system function, a location of a base station of a camera-equipped portable terminal nearest to the location where a photograph was taken, and a fact that a portable terminal is located indoors.

14. The program according to claim 13, wherein the image processing method accounts for both the photographing location and the photographing time when setting the first image processing condition for the image processing.

15. A program for making a computer execute an image processing method for reading image data stored in image storage means, carrying out image processing, under predetermined image processing conditions, for the read image data to obtain processed image data, and transmitting the processed image data to a portable terminal which requests transmission of the processed image data, comprising the steps of:
  acquiring terminal information containing any of a location of the portable terminal, a time of making the transmission request and a model information of the portable terminal;

setting a first image processing condition for the image processing based on the terminal information;

setting a second image processing condition for the image processing based on the image data; and setting the predetermined image processing conditions based on the first and second image processing conditions.

16. The program according to claim 15, wherein the portable terminal is camera-equipped.

17. A program for making a computer execute an image processing method for acquiring processed image data by carrying out image processing, under predetermined image processing conditions, for image data acquired by a camera-equipped portable terminal, to which photographic information containing a photographing location and photographing time is added, and transmitting the processed image data to the camera-equipped portable terminal, comprising the steps of:

acquiring the photographic information from the image data;

setting a first image processing condition for the image processing based on the photographic information;

setting a second image processing condition for the image processing based on the image data;

acquiring terminal information containing any of a location of the camera-equipped portable terminal, a time of making a transmission request and model information of the camera-equipped portable terminal;

setting a third image processing condition for the image processing based on the terminal information; and setting the predetermined image processing conditions based on the first, second and third image processing conditions, wherein the photographing location comprises any of a latitude and longitude obtained by a global positioning system function, a location of a base station of a camera-equipped portable terminal nearest to the location where a photograph was taken, and a fact that a portable terminal is located indoors.

18. The program according to claim 17, wherein the image processing method accounts for both the photographing location and the photographing time when setting the first image processing condition for the image processing.

19. A data transmission method for transmitting predetermined data to a terminal in response to a request from the terminal, comprising the steps of:

acquiring transmission request information transmitted from the terminal requesting transmission of desired data, and terminal information indicating a model of the terminal;

deciding a type of data to be transmitted to the terminal based on the transmission request information and the terminal information; and transmitting the decided type of data to the terminal, wherein said type of data to be transmitted is decided from among requested data processed by image processing, requested data along with an image processing application program, and requested data only.

20. A data transmission method according to claim 19, wherein if the transmission request information is requesting transmission of image data stored in image storage means, based on the transmission request information, requested image data is read from the image storage means in accordance with the transmission request information and, based on the terminal information, a decision is made as to whether either one of first data constituted of processed request image data acquired by carrying out image processing for the requested image data, and second data constituted of the requested image data and the image processing application program for carrying out image processing for the request image data is to be transmitted to the terminal.

21. A data transmission method according to claim 20, wherein if the transmission of the second data is decided, a determination is made as to whether the image processing application program has been transmitted to the terminal which transmitted the transmission request information, if the determination is positive, transmission of third data constituted of only the requested image data to the terminal is decided in location of the second data and, if the determination is negative, transmission of the second data to the terminal is decided.

22. A data transmission method according to claim 19, wherein if the transmission request information is requesting transmission of image data stored in image storage means, based on the transmission request information, requested image data is read from the image storage means in accordance with the transmission request information, a determination is made as to whether the transmission request information contains information for transmission of processed requested image data acquired by carrying out image processing for the requested image data, if the determination is positive, transmission of first data constituted of the processed requested image data acquired by carrying out the image processing for the requested image data to the terminal is decided and, if the determination is negative, based on the terminal information, transmission of either one the first data constituted of the requested image data and second data constituted of the image processing application program for carrying out image processing for the request image data is decided.

23. A data transmission method according to claim 22, wherein if the transmission of the second data is decided, a determination is made as to whether the image processing application program has been transmitted to the terminal which transmitted the transmission request information, if the determination is positive, transmission of third data constituted of only the requested image data to the terminal is decided in location of the second data and, if the determination is negative transmission of the second data to the terminal is decided.

24. A data transmission method according to claim 19, wherein the terminal is a camera-equipped terminal having a camera for acquiring image data by photographing and, if the transmission request information is for requesting transmission of information indicating advisability of image processing in the camera-equipped terminal for the image data acquired by the camera-equipped terminal, based on the terminal information, a decision is made as to whether either one of fourth data representing information for request of transmission of the acquired image data, and fifth data constituted of the image processing application program for carrying out image processing for the acquired image data is transmitted to the camera-equipped terminal.

25. The data transmission method according to claim 19, wherein the type of data comprises an image processing application program or an image data file.

26. A data transmission apparatus for transmitting predetermined data to a terminal in response to a request from the terminal, comprising:

information acquiring means for acquiring transmission request information transmitted from the terminal to request transmission of desired data, and terminal information indicating a model of the terminal;

transmission data deciding means for deciding a type of data to be transmitted to the terminal based on the transmission request information and the terminal information; and transmission means for transmitting the decided type of data to the terminal, wherein said type of data to be transmitted is decided from among requested data processed by image processing, requested data along with an image processing application program, and requested data only.

27. A data transmission apparatus according to claim 26, further comprising image storage means for storing the image data, and reading means for reading requested image data based on the transmission request information from the image storage means in accordance with the transmission request information if the transmission request information is for requesting transmission of the image data stored in the image storage means, wherein the transmission data deciding means makes a decision, if the transmission request information is for requesting the transmission of the image data stored in the image storage means, based on the terminal information, as to whether either one of first data constituted of processed request image data acquired by carrying out image processing for the requested image data, and second data constituted of the requested image data and the image processing application program for carrying out image processing for the request image data is transmitted to the terminal.

28. A data transmission apparatus according to claim 27, wherein the transmission data deciding means makes a determination, if the transmission of the second data is decided, as to whether the image processing application program has been transmitted to the terminal which has transmitted the transmission request information, decides transmission of third data constituted of only the requested image data to the terminal in location of the second data if the determination is positive, and decides transmission of the second data to the terminal if the determination is negative.

29. A data transmission apparatus according to claim 26, further comprising image storage means for storing the image data, and reading means for reading based on the transmission request information requested image data from the image storage means in accordance with the transmission request information if the transmission request information is for requesting transmission of the image data stored in the image storage means, wherein the transmission data deciding means reads requested image data from image storage means in accordance with the transmission request information, based on the transmission request information if the transmission request information is for requesting transmission of image data stored in the image storage means, makes a determination as to whether the transmission request information contains information for transmission of processed requested image data acquired by carrying out image processing for the requested image data, if the determination is positive, decides transmission of first data constituted of the processed requested image data acquired by carrying out the image processing for the requested image data to the terminal, and if the determination is negative, based on the terminal information, decides transmission either one of the first data or second data constituted of the requested image data and the image processing application program for carrying out image processing for the request image data.

30. A data transmission apparatus according to claim 29, wherein the transmission data deciding means makes a determination, if the transmission of the second data is decided, as to whether the image processing application program has been transmitted to the terminal which has transmitted the transmission request information, decides transmission of third data constituted of only the requested image data to the terminal in location of the second data if the determination is positive, and decides transmission of the second data to the terminal if the determination is negative.

31. A data transmission apparatus according to claim 26, wherein the terminal is a camera-equipped terminal having a camera capable of acquiring image data by photographing and, if the transmission request information is for requesting transmission of information indicating advisability of image processing in the camera-equipped terminal for the image data acquired by the camera-equipped terminal, based on the terminal information, the transmission data deciding means makes a decision as to whether either one of fourth data representing information for requesting of transmission of the acquired image data, and fifth data constituted of the image processing application program for carrying out image processing for the acquired image data is transmitted to the camera-equipped terminal.

32. The data transmission apparatus according to claim 26, wherein the type of data comprises an image processing application program or an image data file.

33. A program for making a computer execute a data transmission method for transmitting predetermined data to a terminal in response to a request from the terminal, comprising the steps of:

acquiring transmission request information transmitted from the terminal to request transmission of desired data, and terminal information indicating a model of the terminal;

deciding a type of data to be transmitted to the terminal based on the transmission request information and the terminal information; and transmitting the decided type of data to the terminal, wherein said type of data to be transmitted is decided from among requested data processed by image processing, requested data along with an image processing application program, and requested data only.

34. A program according to claim 33, further comprising a reading step of reading based on the transmission request information, requested image data from the image storage means in accordance with the transmission request information if the transmission request information is for requesting transmission of the image data stored in the image storage means, wherein the deciding step makes a decision as to whether either one of first data constituted of processed request image data acquired by carrying out image processing for the requested image data, and second data constituted of the requested image data and the image processing application program for carrying out image processing for the requested image data is transmitted to the terminal based on the terminal information.

35. A program according to claim 34, wherein the deciding step makes a determination, if the transmission of the second data is decided, as to whether the image processing application program has been transmitted to the terminal which has transmitted the transmission request information, if the determination is positive decides transmission of third data constituted of only the requested image data to the terminal in location of the second data, and if the determination is negative decides transmission of the second data to the terminal.

36. A program according to claim 33, further comprising a reading step of reading based on the transmission request information, requested image data from the image storage means in accordance with the transmission request information if the transmission request information is for requesting transmission of the image data stored in the image storage means, wherein the deciding step makes a determination as to whether the transmission request information contains information for transmission of processed requested image data acquired by carrying out image processing for the requested image data, if the determination is positive decides transmission of first data constituted of the processed requested image data acquired by carrying out the image processing for the requested image data to the terminal, and if the determination is negative, based on the terminal information decides transmission of either one of the first data, and second data constituted of the requested image data and the image processing application program for carrying out image processing for the request image data.

37. A program according to claim 36, wherein the deciding step makes a determination, if the transmission of the second data is decided, as to whether the image processing application program has been transmitted to the terminal which has transmitted the transmission request information, decides if the determination is positive transmission of third data constituted of only the requested image data to the terminal in location of the second data, and if the determination is negative decides transmission of the second data to the terminal.

38. A program according to claim 33, wherein the terminal is a camera-equipped terminal having a camera capable of acquiring image data by photographing and, if the transmission request information is for requesting transmission of information indicating advisability of image processing in the camera-equipped terminal for the image data acquired by the camera-equipped terminal, based on the terminal information, the deciding step makes a decision as to whether either one of fourth data representing information of transmission of the acquired image data, and fifth data constituted of the image processing application program for carrying out image processing for the acquired image data is transmitted to the camera-equipped terminal.

39. The program according to claim 33, wherein the type of data comprises an image processing application program or an image data file.

* * * * *